(12) United States Patent
Miyasaka

(10) Patent No.: US 9,189,185 B2
(45) Date of Patent: Nov. 17, 2015

(54) DATA MANAGEMENT SYSTEM, DATA MANAGEMENT METHOD, AND DATA MANAGEMENT APPARATUS

(71) Applicant: Daiya Miyasaka, Chiba (JP)

(72) Inventor: Daiya Miyasaka, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/294,348

(22) Filed: Jun. 3, 2014

(65) Prior Publication Data

US 2014/0362404 A1 Dec. 11, 2014

(30) Foreign Application Priority Data

Jun. 11, 2013 (JP) .................................. 2013-122455

(51) Int. Cl.
*G06F 15/00* (2006.01)
*G06F 3/12* (2006.01)
*G06F 21/62* (2013.01)

(52) U.S. Cl.
CPC ............ *G06F 3/1222* (2013.01); *G06F 3/1238* (2013.01); *G06F 3/1273* (2013.01); *G06F 3/1293* (2013.01); *G06F 21/62* (2013.01); *G06F 21/6209* (2013.01)

(58) Field of Classification Search
CPC .............................. G06F 3/1238; G06F 3/1203
USPC ........................................ 358/1.15
See application file for complete search history.

(56) References Cited

U.S. PATENT DOCUMENTS

| | | | |
|---|---|---|---|
| 2007/0061889 | A1 | 3/2007 | Sainaney |
| 2009/0327409 | A1 | 12/2009 | Mayer et al. |
| 2011/0286026 | A1* | 11/2011 | Matsuzawa ................. 358/1.14 |
| 2012/0240243 | A1 | 9/2012 | Allardyce |

FOREIGN PATENT DOCUMENTS

| | | |
|---|---|---|
| EP | 1916628 | 4/2008 |
| JP | 2004-227521 | 8/2004 |
| JP | 2004-336315 | 11/2004 |
| JP | 2009-217614 | 9/2009 |
| JP | 2012-098792 | 5/2012 |

OTHER PUBLICATIONS

Extended European Search Report dated Jun. 29, 2015.

* cited by examiner

*Primary Examiner* — Saeid Ebrahimi Dehkordy
(74) *Attorney, Agent, or Firm* — IPUSA, PLLC

(57) ABSTRACT

A data management system, which is implemented by one or more information processing apparatuses, includes a program storage unit that stores an operation management program, a generating unit that embeds the operation management program in first data and thereby generates second data including the operation management program. When an operation is performed on the second data at an external apparatus, the operation management program sends operation information indicating the operation from the external apparatus to the data management system.

18 Claims, 22 Drawing Sheets

FIG.6

| FILE ID | TOTAL NO. OF PAGES | VIEWED | VIEWED PAGES | VIEWED DATE AND TIME | IP ADDRESS OF VIEWED LOCATION | PRINTED | PRINTED DATE AND TIME | IP ADDRESS OF PRINTED LOCATION | |
|---|---|---|---|---|---|---|---|---|---|
| 1 | 10 | ◯ | 1-10 | 2013/6/2 11:25:30 | 1xx.xxx.xxx.xxx | ◯ | 2013/6/3 8:10:11 | 1xx.xxx.xxx.xxx | ... |
| 2 | 6 | - | - | - | - | - | - | - | ... |
| 3 | 12 | ◯ | 1-5, 9-12 | 2013/5/31 16:54:12 | 2xx.xxx.xxx.xxx | - | - | - | ... |
| 4 | 2 | ◯ | 1-2 | 2013/6/4 9:13:41 | 1xx.xxx.xxx.xxx | ◯ | 2013/6/4 12:45:14 | 2xx.xxx.xxx.xxx | ... |
| 5 | 21 | - | - | - | - | ◯ | 2013/6/4 12:45:14 | 1xx.xxx.xxx.xxx | ... |
| ... | ... | ... | ... | ... | ... | ... | ... | ... | ... |

| KEYWORD ID | KEYWORD | ... |
|---|---|---|
| 1 | INTERNAL USE ONLY | ... |
| 2 | CLASSIFIED | ... |
| 3 | CONFIDENTIAL | ... |
| 4 | PERSONAL INFORMATION | ... |
| 5 | TEL | ... |
| ⋮ | ⋮ | ⋮ |

| ADDRESS ID | IP ADDRESS | LOCATION | DISPLAY PERMISSION |
|---|---|---|---|
| 1 | 1XX.XXX.1 | HEADQUARTERS | YES |
| 2 | 2XX.XXX.1 | KANSAI BRANCH | YES |
| 3 | UNREGISTERED ADDRESS | UNKNOWN | NO |
| ... | ... | ... | ... |

FIG.21

| FLOW ID | WORKFLOW DEFINITION | | | | |
|---|---|---|---|---|---|
| | EXECUTION ORDER 1 | EXECUTION ORDER 2 | EXECUTION ORDER 3 | EXECUTION ORDER 4 | ... |
| 1 | PDF CONVERSION PLUG-IN | OPERATION MANAGEMENT PROGRAM EMBEDDING PLUG-IN | DELIVERY PLUG-IN | — | ... |
| 2 | PDF CONVERSION PLUG-IN | DELIVERY PLUG-IN | — | — | ... |
| 3 | DELIVERY PLUG-IN | — | — | — | ... |
| ... | ... | ... | ... | ... | ... |

~1080

DATA MANAGEMENT SYSTEM, DATA MANAGEMENT METHOD, AND DATA MANAGEMENT APPARATUS

CROSS-REFERENCE TO RELATED APPLICATION

The present application is based upon and claims the benefit of priority of Japanese Patent Application No. 2013-122455, filed on Jun. 11, 2013, the entire contents of which are incorporated herein by reference.

BACKGROUND OF THE INVENTION

1. Field of the Invention

An aspect of this disclosure relates to a data management system, a data management method, and a data management apparatus.

2. Description of the Related Art

A file management system stores, provides (sends, delivers, or distributes), and manages electronic files (which are hereafter simply referred to as "files") such as document files and image files. Such a file management system makes it possible to provide files via a network using, for example, an email or a shared folder. While a file management system enables users to easily share files, it may pose a risk that files are obtained by unauthorized users and distributed to unknown places. Also, a provider of a file cannot determine or manage the status of the file after it is received by a receiver (e.g., whether the file is viewed or printed by the receiver). Thus, a file management system has a security risk.

Here, there exist technologies that allow a provider of a file to determine the status of the file after it is received by a receiver. For example, there is a technology such as the Message Disposition Notification (MDN) for reporting to a sender of an email that a receiver has opened or received the email.

Also, there exist technologies for preventing an unauthorized user from viewing or printing a delivered file containing confidential information. For example, there is a technology for protecting a file with a password. Also, there is a technology (e.g., tint block printing) that makes information in a file illegible when the information is printed by a printer or a multifunction peripheral.

However, MDN can be used only for reception of emails. That is, MDN cannot be used to determine whether (or when) a file, which has been delivered via a protocol such as the File Transfer Protocol (FTP) or the Server Message Block (SMB), is opened. Also with the above technologies, it is not possible to determine when and where a delivered file is printed.

Here, Japanese Laid-Open Patent Publication No. 2004-336315 discloses a system where a sender apparatus and a receiver apparatus are connected to an electronic document delivery server. In the system, a sender operating the sender apparatus can determine the delivery status of an electronic document via the electronic document delivery server.

However, the technology disclosed by Japanese Laid-Open Patent Publication No. 2004-336315 only makes it possible to confirm the delivery of electronic documents sent from sender apparatuses to receiver apparatuses that are connected to the electronic document delivery server and managed by the system. That is, the technology of Japanese Laid-Open Patent Publication No. 2004-336315 does not make it possible to confirm the delivery of electronic documents sent to apparatuses not being managed by the system. Accordingly, the technology of Japanese Laid-Open Patent Publication No. 2004-336315 does not make it possible to determine where and when an electronic document, which is sent to an apparatus not being managed by the system, is viewed or printed. Also, the technology of Japanese Laid-Open Patent Publication No. 2004-336315 requires a large cost to construct the system.

SUMMARY OF THE INVENTION

In an aspect of this disclosure, there is provided a data management system implemented by one or more information processing apparatuses. The data management system includes a program storage unit that stores an operation management program, a generating unit that embeds the operation management program in first data and thereby generates second data including the operation management program. When an operation is performed on the second data at an external apparatus, the operation management program sends operation information indicating the operation from the external apparatus to the data management system.

BRIEF DESCRIPTION OF THE DRAWINGS

FIG. 6 is a table illustrating exemplary operation histories stored in an operation history storage unit according to the first embodiment;

FIG. 11 is a table illustrating exemplary information stored in an operation management target information storage unit according to the first variation of the first embodiment;

FIG. 21 is a table illustrating exemplary information stored in a flow definition storage unit according to the third embodiment.

DESCRIPTION OF THE PREFERRED EMBODIMENTS

Preferred embodiments of the present invention are described below with reference to the accompanying drawings.

First Embodiment

System Configuration

Figure 1:
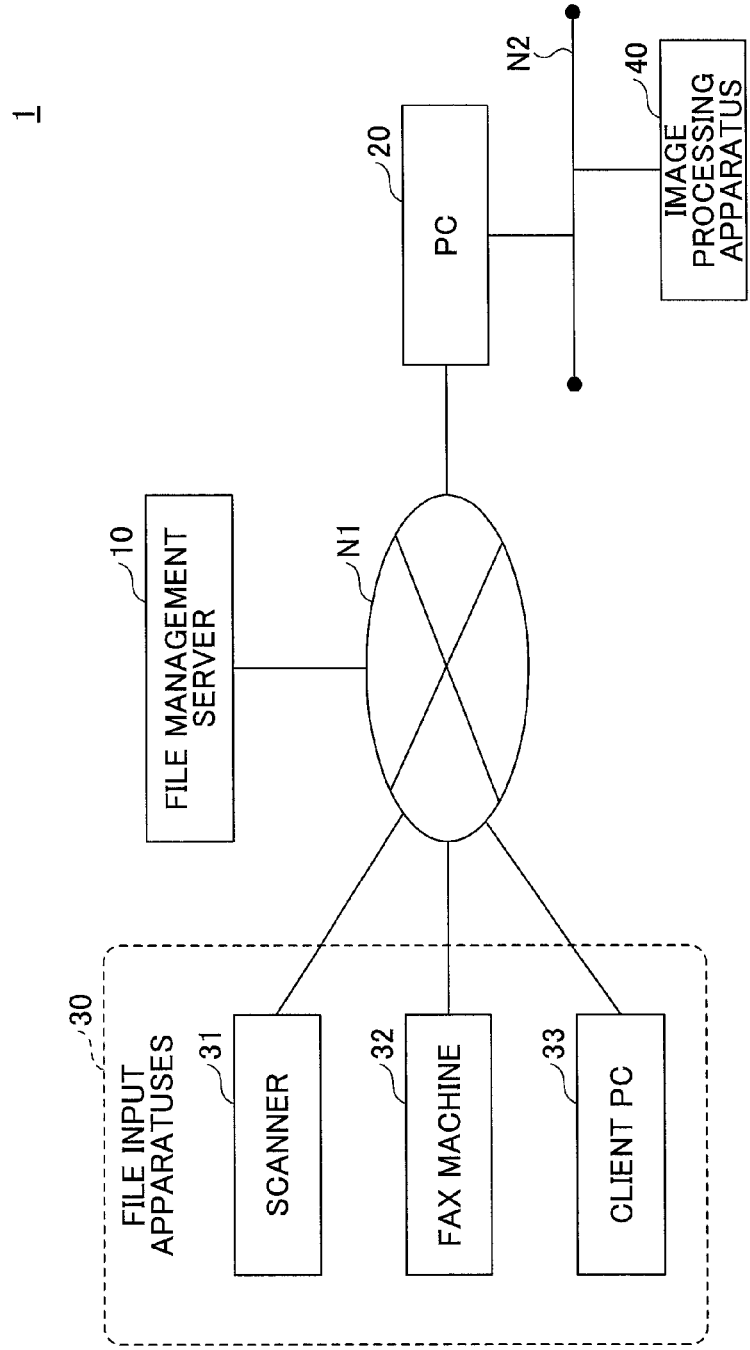
FIG. 1 is a drawing illustrating an exemplary configuration of a file management system according to a first embodiment.

FIG. 1 is a drawing illustrating an exemplary configuration of a file management system 1 according to a first embodiment. As illustrated by FIG. 1, the file management system 1 includes a file management server 10, a personal computer (PC) 20, file input apparatuses 30, and an image processing apparatus 40. The file management server 10, the PC 20, and the file input apparatuses 30 are connected to each other via a wired or wireless network N1 such as the Internet or a local area network (LAN). The PC 20 and the image processing apparatus 40 are connected to each other via a wired or wireless network N2 such as a LAN.

When receiving an electronic file (which is hereafter simply referred to as a "file") together with a delivery method and a destination from one of the file input apparatuses 30, the file management server 10 generates a file by embedding a predetermined program in the received file, and delivers the generated file to the destination. The file management server 10 is an example of an information apparatus. The predetermined program is an operation management program for managing operations (or events) performed on the file. Examples of "files" include a document file (or document data) and an image file (or image data). In the present embodiment, a "file" is an example of electronic data (which may be simply referred to as "data").

From the view point of the file management server 10, the PC 20 is an external apparatus. The PC 20 is an example of a destination computer in a delivery process performed by the file management server 10. File viewing/printing software for viewing and printing a file is installed in the PC 20. A user of the PC 20 can use the file viewing/printing software to view and print a file delivered from the file management server 10. The PC 20 may be replaced with any other apparatus or device such as a smartphone or a tablet terminal that can be used to view or print a file. An external apparatus is not limited to the PC 20 to which a file is directly delivered from the file management server 10. For example, an apparatus to which a delivered file is transferred from the PC 20 or an apparatus that reads a delivered file from a folder of the PC 20 may also be referred to as an external apparatus.

The file input apparatuses 30 are used to input files to the file management server 10 and include, for example, a scanner 31, a fax machine 32, and a client PC 33 (each of which may be referred to as a file input apparatus 30). The scanner 31 scans a document to obtain an image file, and sends the image file to the file management server 10. The fax machine 32 scans a document to obtain image information, and sends the image information to the file management server 10. The client PC 33 includes a folder into which files are input. The file management server 10 monitors the folder of the client PC 33, and retrieves the files from the folder (i.e., the files are uploaded to the file management server 10). The client PC 33 also sends an email with an attached file to the file management server 10. When inputting a file to the file management server 10, the file input apparatus 30 specifies a delivery method and a destination of the file.

The image processing apparatus 40 is an example of an output apparatus including an image processing function, and may be implemented by, for example, a printer or a multifunction peripheral (MFP) for printing (or outputting) print data (e.g., page description language (PDL) data). The image processing apparatus 40 performs printing based on print data sent from the PC 20. The image processing apparatus 40 is not limited to a printer and an MFP for printing print data. For example, the image processing apparatus 40 may be implemented by a projector, an organic electroluminescence (EL) display, or a liquid crystal display for displaying (or outputting) display data (image data) that is an example of output data.

One or more of functions of the file management server 10 may be distributed to one or more other apparatuses. Also, the network N1 and the network N2 may be combined into a single network.

<System Operations>

Figure 2:
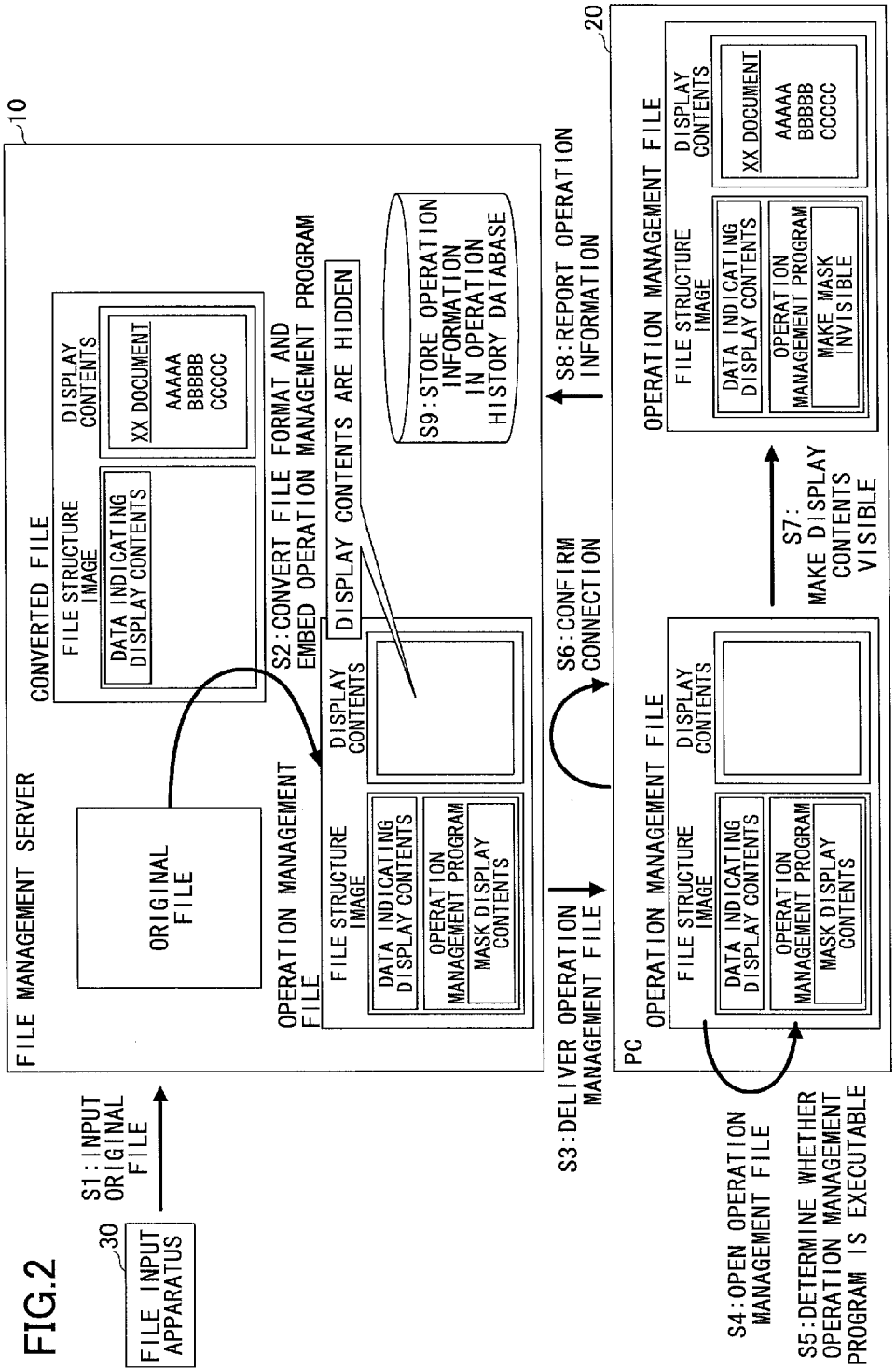
FIG. 2 is a drawing illustrating exemplary operations performed in a file management system according to the first embodiment.

Exemplary operations performed in the file management system 1 of the first embodiment are outlined below. FIG. 2 is a drawing illustrating exemplary operations performed in the file management system 1 according to the first embodiment.

The file input apparatus 30 inputs an original file, which is generated by or stored in the file input apparatus 30, to the file management server 10 (S1). The original file may have any file format such as an MS Word (registered trademark) format, an MS Excel (registered trademark) format, an MS PowerPoint (registered trademark) format, a Joint Photographic Experts Group (JPEG) format, a Tagged Image File Format (TIFF), or a Portable Document Format (PDF). The file input apparatus may also send information indicating a destination (e.g., an IP address of the PC 20 or a URL of a shared folder) together with the original file to the file management server 10.

When receiving the original file from the file input apparatus 30, the file management server 10 converts the file format of the original file into a predetermined file format, and generates an operation management file by embedding an operation management program in the converted file (S2). In step S2, the conversion of the file format may be omitted.

As illustrated in FIG. 2, the operation management file has a file structure including "data indicating display contents" that describes text, a figure, or an image to be displayed or printed, and an "operation management program". Display contents of the operation management file where the operation management program is embedded are masked to hide the display contents when the operation management file is viewed or printed. The predetermined file format into which the original file is converted may be, for example, a PDF format. The operation management program may be, for example, a JavaScript (registered trademark) program (source code) that can be embedded in a PDF file. Hiding (or masking) the display contents of the operation management file makes it possible to prevent the display contents from being viewed or printed when the operation management file is outside of the management of the file management server 10. In the example of FIG. 2, the display contents are hidden by masking the display contents with a white rectangle. However, any other method may be used to hide the display contents. When the operation management file includes multiple pages of display contents, the display contents on all of the pages are hidden. Because the operation management program is embedded in the operation management file, it is possible to hide the display contents as a default even when the operation management file is copied, moved, saved with a different name, or converted into a different file format, and regardless of whether the display contents of the original operation management file is in a visible state or a hidden state.

Next, the file management server 10 delivers the generated operation management file to the PC 20 that is specified as a destination by the file input apparatus 30 (S3). The destination is not limited to the PC 20 connected via the network N1 to the file management server 10.

The PC 20 receives the operation management file and stores the operation management file in, for example, a memory. Then, the operation management file is opened using the file viewing/printing software (S4).

When the operation management file is opened, the operation management program determines whether the operation management program is in an executable environment (i.e., whether the operation management program is executable in a current environment) (S5).

Next, the operation management program determines whether network communication with the file management server 10 is possible (i.e., confirms connection with the file management server 10) (S6).

When the operation management program is in an executable environment and network communication with the file management server 10 is possible, the operation management program makes visible the hidden display contents of the operation management file (i.e., hides the mask) (S7).

When an operation such as viewing or printing is performed on the operation management file using the file viewing/printing software, the operation management program reports information (operation information) indicating the performed operation to the file management server (S8).

When receiving the operation information from the PC 20, the file management server 10 stores the operation information in an operation history database storing an operation history for each operation management file (S9).

As described above, according to the file management system 1 of the first embodiment, an operation management program is embedded in a file to be delivered to a destination. This configuration makes it possible to manage a history of operations performed on the file at the destination. Also with the configuration of the first embodiment, the display contents of the operation management file are hidden unless the operation management file is in a condition where it can be managed by the file management server 10. This configuration makes it possible to reduce, for example, the risk of information leakage. Also with the first embodiment, because an operation management program is embedded in a file itself, it is possible to manage operations performed on the file even when the file is transferred from the PC 20, i.e., an original destination, to another apparatus whose information is not being managed by the file management server 10.

<Hardware Configuration>
[File Management Server]

Figure 3:
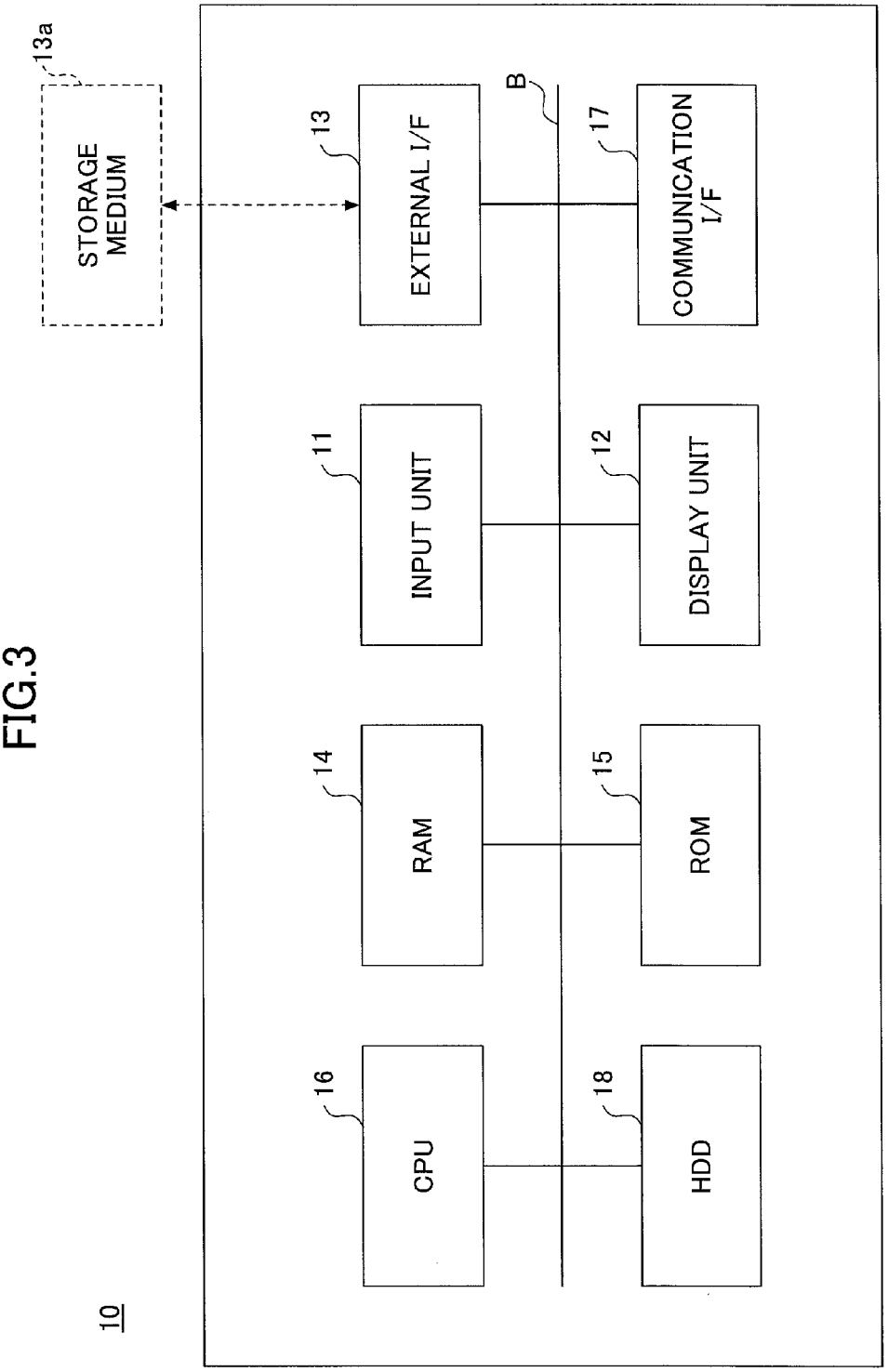
FIG. 3 is a block diagram illustrating an exemplary hardware configuration of a file management server according to the first embodiment.

FIG. 3 is a block diagram illustrating an exemplary hardware configuration of the file management server 10 according to the first embodiment.

As illustrated by FIG. 3, the file management server 10 may include an input unit 11, a display unit 12, an external interface (I/F) 13, a random access memory (RAM) 14, a read only memory (ROM) 15, a central processing unit (CPU) 16, a communication I/F 17, and a hard disk drive (HDD) 18 that are connected to each other via a bus B.

The input unit 11 includes, for example, a keyboard, a mouse, and/or a touch panel, and is used by a user to input instructions (or operation signals) to the file management server 10. The display unit 12 displays, for example, processing results of the file management server 10.

The communication I/F 17 is an interface for connecting the file management server 10 to one or both of the networks N1 and N2. The file management server 10 can perform data communications with other apparatuses via the communication I/F 17.

The HDD 18 is a non-volatile storage device for storing various programs and data. For example, the HDD 18 stores basic software or an operating system (OS) for controlling the entire file management sever 10, application software for providing various functions on the OS, and an operation management program. The HDD 18 may manage the stored programs and data using a file system and/or a database (DB).

The external I/F 13 is an interface between the file management server 10 and an external storage (or external device) such as a storage medium 13a. The file management server 10 can read and write data from and to the storage medium 13a via the external I/F 13. The storage medium 13a may be implemented by, for example, a flexible disk, a compact disk (CD), a digital versatile disk (DVD), a secure digital (SD) memory card, or a universal serial bus (USB) memory.

The ROM 15 is a non-volatile semiconductor memory (storage unit) that can retain programs and data even when power is turned off. For example, the ROM 15 stores programs and data such as a basic input/output system (BIOS) that is executed when the file management server 10 is turned on, and system and network settings of the file management server 10. The RAM 14 is a volatile semiconductor memory (storage unit) for temporarily storing programs and data.

The CPU (processor) 16 loads programs and data from storage units (e.g., the ROM 15 and the HDD 18) into the RAM 14, and executes the loaded programs to control the file management server 10 and implement various functional units of the file management server 10.

[PC]

The hardware configuration of the PC 20 may be similar to the hardware configuration of the file management server 10 described above with reference to FIG. 3.

[Image Processing Apparatus]

Figure 4:
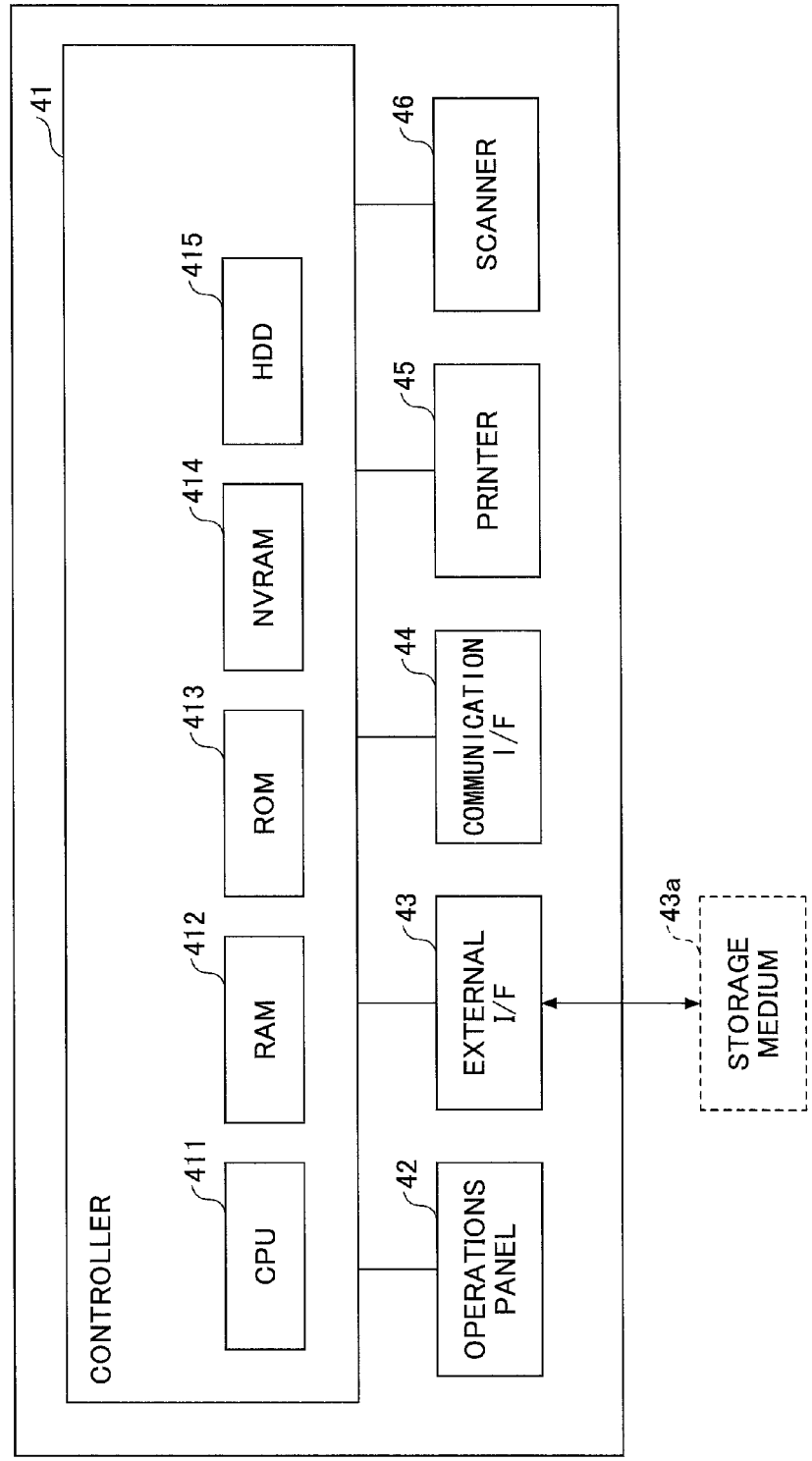
FIG. 4 is a block diagram illustrating an exemplary hardware configuration of an image processing apparatus according to the first embodiment.

FIG. 4 is a block diagram illustrating an exemplary hardware configuration of the image processing apparatus 40 according to the first embodiment.

As illustrated by FIG. 4, the image processing apparatus 40 may include a controller 41, an operations panel 42, an external I/F 43, a communication I/F 44, a printer 45, and a scanner 46.

The controller 41 may include a CPU 411, a RAM 412, a ROM 413, a non-volatile RAM (NVRAM) 414, and an HDD 415. The ROM 413 stores various programs and data. The RAM 412 temporarily stores programs and data. The NVRAM 414 stores, for example, various settings. The HDD 415 stores various programs and data.

The CPU (processor) 411 loads programs, data, and settings from storage units (e.g., the ROM 413, the NVRAM 414, and HDD 415) into the RAM 412, and executes the loaded programs to control the image processing apparatus 40 and implement various functional units of the image processing apparatus 40.

The operations panel 42 includes an input unit for receiving user inputs and a display unit for displaying information. The external I/F 43 is an interface between the image processing apparatus 40 and an external storage (or external device) such as a storage medium 43a. The image processing apparatus 40 can read and write data from and to the storage medium 43a via the external I/F 43. Examples of the storage medium 43a include an IC card, a flexible disk, a CD, a DVD, an SD memory card, and a USB memory.

The communication I/F 44 is an interface for connecting the image processing apparatus 40 to the network N2. The image processing apparatus 40 can perform data communications with other apparatuses via the communication I/F 44.

The printer 45 prints data on a recording medium such as paper. The scanner 46 scans a document to obtain image data.

With the above hardware configuration, the image processing apparatus 40 of the first embodiment can perform various processes as described later.

[File Input Apparatus]

The client PC 33, which is an example of the file input apparatus 30, may have a hardware configuration that is similar to the hardware configuration of the file management server 10 described above with reference to FIG. 3. The scanner 31 and the fax machine 32, which are examples of the file input apparatuses 30, may have a hardware configuration that is similar to the hardware configuration of the image processing apparatus 40 described above with reference to FIG. 4.

<Functional Configuration>

Figure 5:
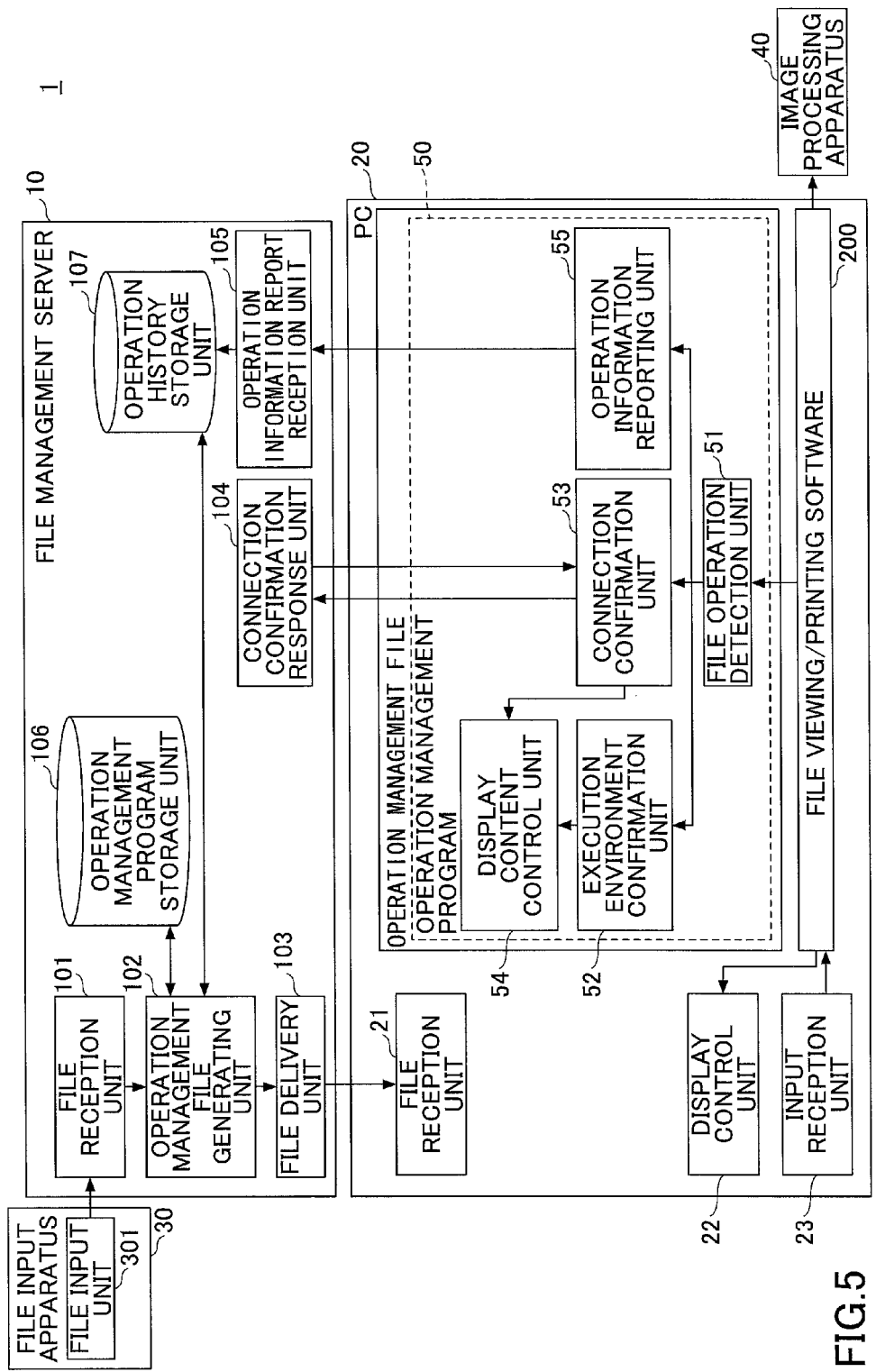
FIG. 5 is a drawing illustrating an exemplary functional configuration of a file management system according to the first embodiment.

FIG. 5 is a drawing illustrating an exemplary functional configuration of the file management system 1 according to the first embodiment.

[File Management Server]

The file management server 10 may include a file reception unit 101, an operation management file generating unit 102, a file delivery unit 103, a connection confirmation response unit 104, an operation information report reception unit 105, an operation management program storage unit 106, and an operation history storage unit 107. These functional units are implemented by executing programs by the CPU 16 and thereby controlling the hardware components of the file management server 10.

The file reception unit 101 receives an original file input by the file input apparatus 30. The file reception unit 101 stores the received original file in a predetermined folder in a storage area of, for example, the RAM 14 or the HDD 15, and reports to the operation management file generating unit 102 that the original file has been stored.

The operation management file generating unit 102 converts the original file stored in the predetermined folder into a predetermined file format (e.g., PDF), obtains an operation management program 50 stored in the operation management program storage unit 106, and generates an operation management file by embedding the operation management program 50 in the converted original file. When generating the operation management file, the operation management file generating unit 102 refers to the operation history storage unit 107 to identify an unused file ID for uniquely identifying the operation management file, and embeds the identified file ID in metadata of the operation management file.

The file delivery unit 103 delivers the operation management file generated by the operation management file generating unit 102 via the network N1 to a destination (i.e., the PC 20). For example, the destination is specified by the file input apparatus 30, or is determined based on the original file or a source (e.g., a folder being monitored) of the original file.

The connection confirmation response unit 104 receives a connection confirmation request from the PC 20 to which the operation management file has been delivered, and sends a response to the connection confirmation request to the PC 20. The connection confirmation request is sent by a function of the operation management program 50. For example, the connection confirmation request is a ping request in the Internet Control Message Protocol (IMCP).

The operation information report reception unit 105 receives an operation information report sent from the PC 20 to which the operation management file has been delivered. The operation information report includes information indicating an operation performed on the operation management file and a file ID for identifying the operation management file. For example, the operation information report may be sent via a communication protocol such as the Simple Object Access Protocol (SOAP).

The operation management program storage unit 106 stores the operation management program 50, and may be implemented, for example, by a storage area of the RAM 14 or the HDD 15.

The operation history storage unit 107 stores histories (operation histories) of operations performed on operation management files, and may be implemented, for example, by a storage area of the RAM 14 or the HDD 15. FIG. 6 is a table illustrating exemplary operation histories stored in the operation history storage unit 107 of to the first embodiment. As illustrated by FIG. 6, the operation history storage unit 107 stores data items (fields) such as "file ID", "total no. of pages", "viewed", "viewed pages", "viewed date and time", "IP address of viewed location", "printed", "printed date and time", and "IP address of printed location". The "file ID" field stores a file ID for uniquely identifying an operation management file. The "total no. of pages" field stores a value indicating the total number of pages of the operation management file. The "viewed" field stores information indicating that the operation management file has been viewed, and the "printed" field stores information indicating that the operation management file has been printed. When an operation information report indicating that viewing or printing has been performed is received, a flag (in this example, "◯") is set in the corresponding one of these fields. The "viewed pages" field stores information indicating pages of the operation management file that have been viewed. The "viewed date and time" field stores information indicating the date and time when the operation management file was viewed, and the "printed date and time" field stores information indicating the date and time when the operation management file was printed. For example, the date and time when the corresponding operation information report is received may be set in each of these fields. In the example of FIG. 6, the last date and time when the operation management file was viewed and the last date and time when the operation management file was printed are set, respectively, in the "viewed date and time" field and the "printed date and time" field for each file ID. Alternatively, the date and time of all previously performed operations may be recorded in the operation history storage unit 107. The "IP address of viewed location" field stores an IP address of the PC 20 where the operation management file has been viewed, and the "IP address of printed location" field stores an IP address of the PC 20 where the operation management file has been printed (or where a print instruction is entered). For example, a sender IP address of the corresponding operation information report may be set in each of these fields. Types of operations to be recorded in the operation history storage unit 107 are not limited to "viewing" and "printing". For example, types of operations to be recorded may also include "saving" the operation management file, "copying" and "moving" the operation management file to another folder or another PC 20, and "editing" the operation management file (when it is editable).

[PC]

Referring back to FIG. 5, the PC 20 may include a file reception unit 21, a display control unit 22, and an input reception unit 23. Also, file viewing/printing software 200 for viewing and printing an operation management file is installed in the PC 20. In FIG. 5, it is assumed that an operation management file has been received from the file management server 10 and is stored in, for example, a memory of the PC 20.

The file reception unit 21 receives a file from the file management server 10, and stores the received file in a predetermined folder in the PC 20.

The display control unit 22 controls a display unit of the PC 20 to display information for the user.

The input reception unit 23 controls an input unit including, for example, a mouse, a keyboard, and/or a touch panel to receive user inputs.

The file viewing/printing software 200 receives user inputs via the input reception unit 23, and performs operations on the operation management file and requests the image processing apparatus 40 to print the operation management file according to the user inputs.

[Operation Management Program]

The operation management program 50 embedded in the operation management file may include a file operation detection unit 51, an execution environment confirmation unit 52, a connection confirmation unit 53, a display content control unit 54, and an operation information reporting unit 55.

The file operation detection unit 51 detects operations performed by the file viewing/printing software 200 on the operation management file. Types of operations detected by the file operation detection unit 51 may include opening, closing, viewing (viewing of respective pages may be detected separately), and printing (start and stop of printing may be detected separately) of the operation management file. When opening of the operation management file is detected, the file operation detection unit 51 reports the detection of opening to the execution environment confirmation unit 52 and the connection confirmation unit 53. Also, when a print request for the operation management file is detected, the file operation detection unit 51 reports the detection of the print request to the connection confirmation unit 53. The file operation detection unit 51 reports the detection of operations also to the operation information reporting unit 55.

When receiving a report from the file operation detection unit 51, the execution environment confirmation unit 52 determines whether the operation management program 50 is in an executable environment, and reports the determination result (execution confirmation result) to the display content control unit 54. For example, when the execution of JavaScript (registered trademark) is enabled in the configuration of the PC 20 and/or the execution of JavaScript (registered trademark) is enabled in the configuration of the operation management file, the execution environment confirmation unit 52 determines that the operation management program 50 is in an executable environment. On the other hand, when the execution of JavaScript (registered trademark) is disabled in the configuration of the PC 20 or when the execution of JavaScript (registered trademark) is disabled in the configuration of the operation management file, the execution environment confirmation unit 52 determines that the operation management program 50 is not in an executable environment.

When receiving a report from the file operation detection unit 51, the connection confirmation unit 53 determines whether the PC 20 (or the operation management program 50) is connectable via a network to the file management server 10. Here, it is assumed that address information (e.g., an IP address) of the file management server 10 is written in advance in the operation management program 50. For example, the connection confirmation unit 53 sends a ping request according to the IMCP to the IP address of the file management server 10. Then, the connection confirmation unit 53 reports the determination result (connection confirmation result) to the display content control unit 54. The method of connection confirmation may not necessarily be performed using a ping request, i.e., in the IP layer. For example, the connection confirmation unit 53 may perform the connection confirmation in an upper layer (e.g., the application layer).

The display content control unit 54 determines whether to make display contents of the operation management file visible based on the determination results from the execution environment confirmation unit 52 and the connection confirmation unit 53. When both of the determination results are "OK" (i.e., the operation management program 50 is in an executable environment and the PC 20 is connectable to the file management server 10), the display content control unit 54 makes the display contents of the operation management file visible (i.e., hides the mask).

The operation information reporting unit 55 sends, to the file management server 10, an operation information report based on the report from the file operation detection unit 51. The operation information reporting unit 55 may send the operation information report via any appropriate communication protocol such as the SOAP.

Figure 7:
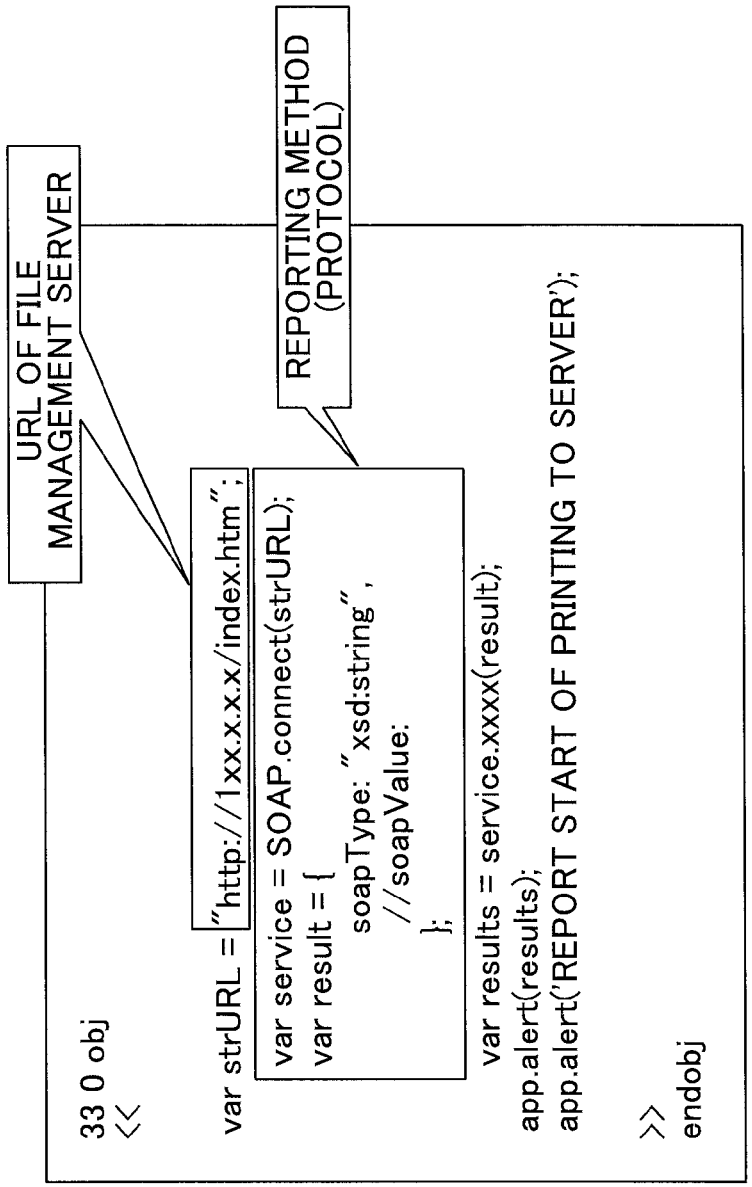
FIG. 7 is a drawing illustrating an exemplary operation management program according to the first embodiment.

The operation management program 50 is written, for example, in JavaScript (registered trademark). FIG. 7 is a drawing illustrating an example of the operation management program 50. The exemplary operation management program 50 of FIG. 7 is configured to report operation information to the file management server 10 when a printing operation is performed.

[File Input Apparatus]

Referring back to FIG. 5, the file input apparatus 30 includes a file input unit 301.

The file input unit 301 inputs a file (original file) to the file management server 10, and also reports a delivery method and a destination of the file to the file management server 10.

<Exemplary Process Performed by File Management System>

Next, an exemplary process performed by the file management system 1 of the first embodiment is described with reference to a sequence chart of FIG. 8. In the exemplary process of FIG. 8, an operation management file is generated and delivered by the file management server 10, the operation management program 50 in the operation management file is executed, and operation information is reported to the file management server 10.

Figure 8:
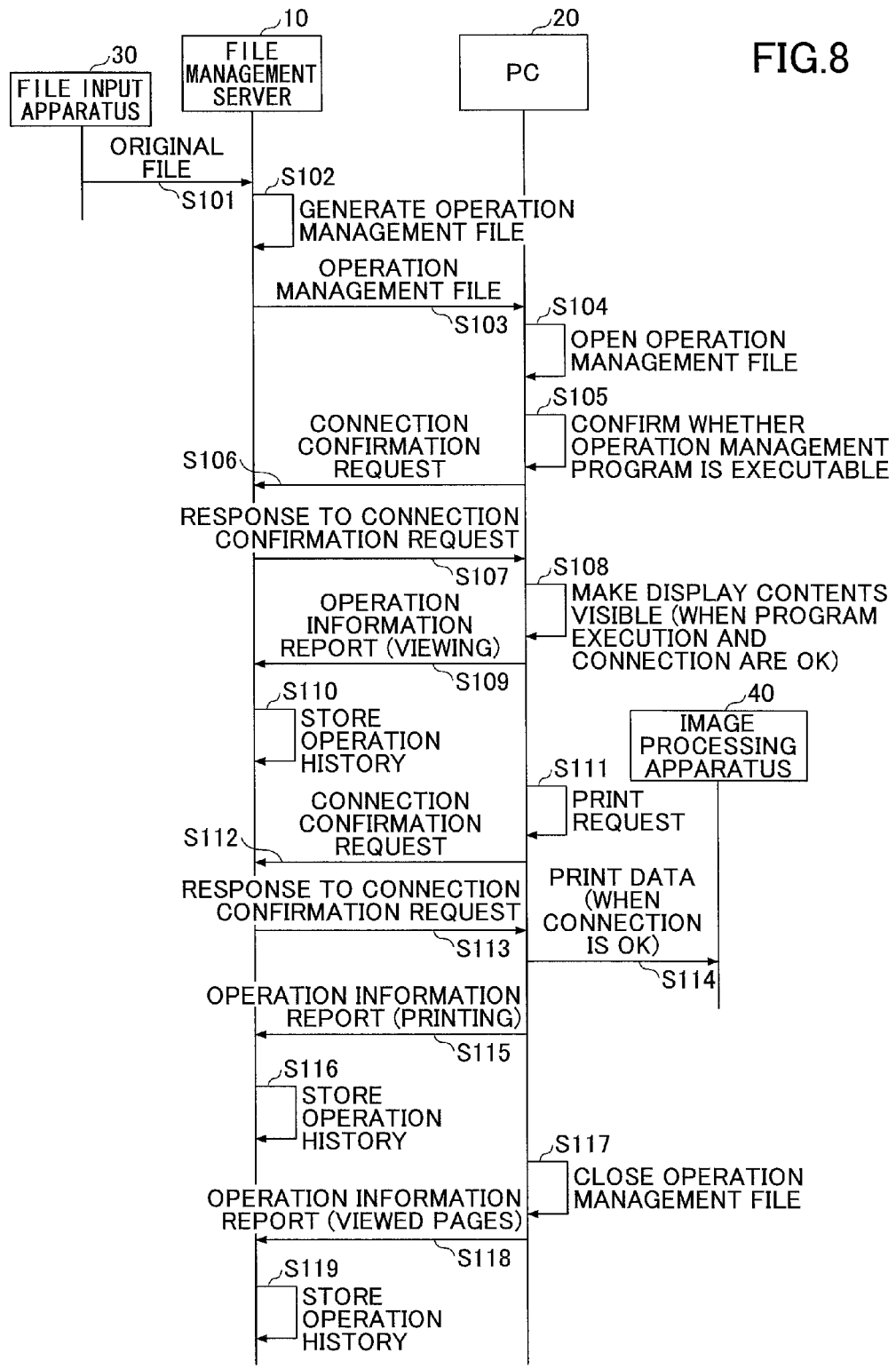
FIG. 8 is a sequence chart illustrating an exemplary process performed by a file management system according to the first embodiment.

As illustrated by FIG. 8, the file input unit 301 of the file input apparatus 30 inputs an original file, together with information indicating a specified delivery method and a specified destination, to the file management server 10 (S101).

When receiving the original file, the file reception unit 101 of the file management server 10 stores the original file in a predetermined folder in the file management server 10, and reports the reception of the original file to the operation management file generating unit 102. The operation management file generating unit 102 converts the original file stored in the predetermined folder into a predetermined file format, obtains the operation management program 50 stored in the operation management program storage unit 106, and generates an operation management file by embedding the operation management program 50 in the converted original file (S102). The operation management file generating unit 102 reports the completion of the generation of the operation management file to the file delivery unit 103. The file delivery unit 103 delivers the operation management file via the network N1 to a specified or determined destination (i.e., the PC 20) (S103).

The file reception unit 21 of the PC 20 receives the operation management file from the file management server 10, and stores the received operation management file in a predetermined folder in the PC 20.

The file viewing/printing software 200 is started in response to, for example, a user instruction received by the input reception unit 23, and the operation management file stored in the predetermined folder is opened by the file viewing/printing software 200 (S104). When detecting the opening of the operation management file, the file operation detection unit 51 of the operation management program 50 in the operation management file reports the detection of the opening to the execution environment confirmation unit 52 and the connection confirmation unit 53.

When receiving the report from the file operation detection unit 51, the execution environment confirmation unit 52 determines whether the operation management program 50 is in an executable environment, and reports the determination result to the display content control unit 54 (S105). In the exemplary process of FIG. 8, it is assumed that the execution environment confirmation unit 52 determines that the operation management program 50 is in an executable environment (determination result is "OK").

When receiving the report from the file operation detection unit 51, the connection confirmation unit 53 sends a connection confirmation request (e.g., a ping request) to the file management server 10 to determine whether the PC 20 (or the operation management program 50) is connectable via a network to the file management server 10 (S106). Here, it is assumed that address information (e.g., an IP address) of the file management server 10, which is a destination of the connection confirmation request, is written in advance in the operation management program 50.

When receiving the connection confirmation request from the PC 20, the connection confirmation response unit 104 of the file management server 10 sends a response (e.g., a ping response) to the connection confirmation request to the PC 20 (S107).

When receiving the response to the connection confirmation request, the connection confirmation unit 53 of the operation management program 50 stored in the PC 20 reports a determination result corresponding to the response to the display content control unit 54. In the exemplary process of FIG. 8, it is assumed that the determination result reported by the connection confirmation unit 53 indicates that the PC 20 is connectable to the file management server 10 (determination result is "OK"). Based on the determination results from the execution environment confirmation unit 52 and the connection confirmation unit 53, the display content control unit 54 determines whether to make display contents of the operation management file visible (or whether to hide the mask). Because both of the determination results from the execution environment confirmation unit 52 and the connection confirmation unit 53 are OK in the example of FIG. 8, the display content control unit 54 makes visible the hidden display contents of the operation management file (S108).

When the display contents are made visible and viewing of the operation management file is detected, the file operation detection unit 51 reports the detection of the viewing to the operation information reporting unit 55. When receiving the report from the file operation detection unit 51, the operation information reporting unit 55 sends an operation information report including operation information indicating the viewing and a file ID of the operation management file, via the network to the file management server 10 (S109).

The operation information report reception unit 105 of the file management server 10 receives the operation information report from the PC 20 to which the operation management file has been delivered. The operation information report reception unit 105 stores the operation information and the file ID included in the operation information report in the operation history storage unit 107 (see FIG. 6) (S110).

The file operation detection unit 51 of the operation management program 50 detects a print request for printing the display contents of the operation management file (S111). The print request is made by the file viewing/printing software 200 in response to an instruction entered by a user of the PC 20 via the input reception unit 23. Then, the file operation detection unit 51 reports the detection of the print request to the connection confirmation unit 53. When receiving the report from the file operation detection unit 51, the connection confirmation unit 53 sends a connection confirmation request via the network to the file management server 10 (S112).

The connection confirmation response unit 104 of the file management server 10 sends a response to the connection confirmation request to the PC 20 (S113). Thus, according to the first embodiment, connection with the file management server 10 is confirmed before the operation management file is printed. This configuration makes it possible to manage operations performed on the operation management file even when a network connection with the file management server 10 is terminated after connection confirmation is performed in response to the opening of the operation management file. When the response sent at step S113 indicates that the PC 20 is not connectable to the file management server 10, the display content control unit 54 hides the display contents in the visible state. In the example of FIG. 8, it is assumed that the response indicates that the PC 20 is connectable to the file management server 10 (determination result is "OK"). When the result of connection confirmation is OK, the file viewing/printing software 200 generates print data of the display contents, and sends the generated print data to the image processing apparatus 40 (S114).

When printing of the operation management file is detected, the file operation detection unit 51 reports the detection of the printing to the operation information reporting unit 55. When receiving the report from the file operation detection unit 51, the operation information reporting unit 55 sends an operation information report including operation information indicating the printing and the file ID of the operation management file, via the network to the file management server 10 (S115).

The operation information report reception unit 105 of the file management server 10 receives the operation information report from the PC 20 to which the operation management file has been delivered. The operation information report reception unit 105 stores the operation information and the file ID included in the operation information report in the operation history storage unit 107 (see FIG. 6) (S116).

The file operation detection unit 51 of the operation management program 50 detects that the operation management file is closed by the file viewing/printing software 200 in response to an instruction entered by a user of the PC 20 via the input reception unit 23 (S117). Then, the file operation detection unit 51 reports the detection of the closing of the operation management file to the operation information reporting unit 55. When receiving the report from the file operation detection unit 51, the operation information reporting unit 55 sends an operation information report including operation information indicating the closing, information indicating pages of the operation management file viewed before the operation management file is closed, and the file ID of the operation management file, via the network to the file management server 10 (S118).

The operation information report reception unit 105 of the file management server 10 receives the operation information report from the PC 20 to which the operation management file has been delivered. The operation information report reception unit 105 stores the operation information, the information indicating the viewed pages, and the file ID included in the operation information report in the operation history storage unit 107 (see FIG. 6) (S119).

<Exemplary Process Performed by Operation Management Program>

Figure 9:
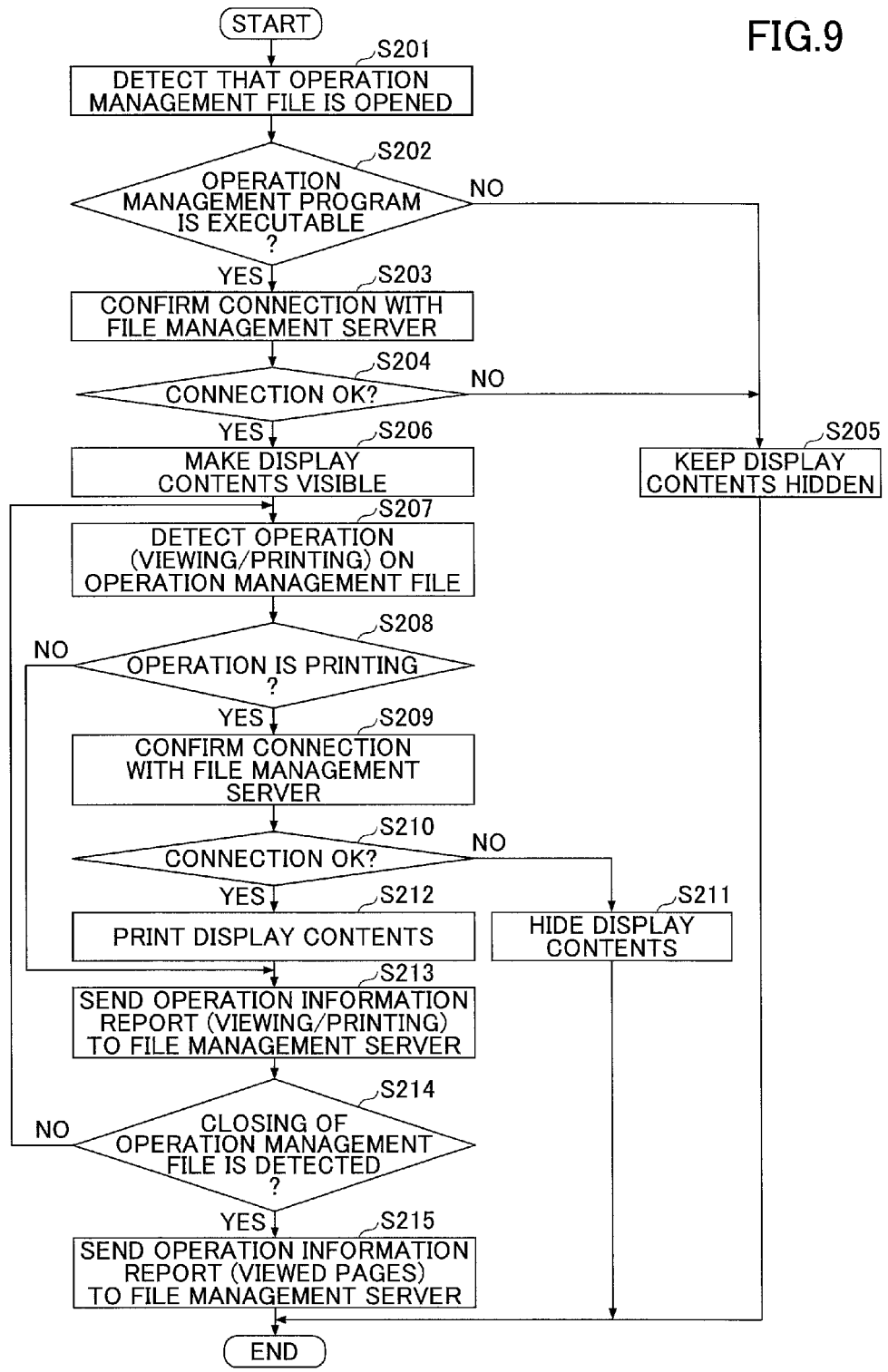
FIG. 9 is a flowchart illustrating an exemplary process performed by an operation management program according to the first embodiment.

Next, an exemplary process performed by the operation management program 50 embedded in the operation management file delivered from the file management server 10 to the PC 20. FIG. 9 is a flowchart illustrating an exemplary process performed by the operation management program 50 according to the first embodiment.

In FIG. 9, it is assumed that the operation management file is delivered to the PC 20 and stored in a predetermined folder in the PC 20.

The file operation detection unit 51 of the operation management program 50 detects that the operation management file is opened by the file viewing/printing software 200 (S201). When the opening of the operation management file is detected, the file operation detection unit 51 reports the detection of the opening to the execution environment confirmation unit 52 and the connection confirmation unit 53.

The execution environment confirmation unit 52 determines whether the operation management program 50 is in an executable environment (S202).

When the operation management program 50 is in an executable environment (YES at step S202), the connection confirmation unit 53 determines whether the PC 20 (or the operation management program 50) is connectable via a network to the file management server 10 (S203).

When the PC 20 is not connectable to the file management server 10 (NO at step S204) or when the operation management program 50 is not in an executable environment (NO at step S202), the display content control unit 54 keeps the display contents of the operation management file hidden (i.e., keeps the mask visible) (S205).

On the other hand, when the PC 20 is connectable to the file management server 10 (YES at step S204), the display content control unit 54 makes visible the hidden display contents of the operation management file (i.e., hides the mask) (S206).

Next, the file operation detection unit 51 detects an operation (e.g., viewing or printing) performed on the operation management file (S207).

The file operation detection unit 51 determines whether the operation is printing (S208). When the operation is printing (YES at step S208), the file operation detection unit 51 requests the connection confirmation unit 53 to determine whether the PC 20 is connectable to the file management server 10 (S209).

When the PC 20 is not connectable to the file management server 10 (NO at step S210), the display content control unit 54 hides the display contents of the operation management file (i.e., makes the mask, which is hidden at step S206, visible again) (S211). Also, instead of hiding the display contents, any other method may be employed to prevent the user from printing the display contents. For example, when the PC 20 is not connectable to the file management server 10, the operation management program 50 may close a print setting screen that is displayed when a print request is entered. As another example, a message may be displayed to report that the printing has failed because the PC 20 is not connectable to the file management server 10.

On the other hand, when the PC 20 is connectable to the file management server 10 (YES at step S210), the display contents are printed (S212).

After step S208 (i.e., when the operation is not printing) or after step S212, the operation information reporting unit 55 sends an operation information report including operation information indicating the performed operation and a file ID of the operation management file to the file management sever 10 (S213).

Next, the file operation detection unit 51 determines whether closing of the operation management file has been detected (S214). When the closing of the operation management file has not been detected (NO at step S214), step S207 and subsequent steps are repeated.

On the other hand, when the closing of the operation management file has been detected (YES at step S214), the operation information reporting unit 55 sends, to the file management sever 10, an operation information report including operation information indicating the closing, information indicating pages of the operation management file viewed before the operation management file is closed, and the file ID of the operation management file (S215).

As described above, according to the file management system 1 of the first embodiment, the file management server 10 generates an operation management file by embedding the operation management program 50 in a file to be delivered. When an operation is performed on the operation management file delivered to a destination, the operation management program 50 reports operation information indicating the performed operation to the file management server 10.

This configuration makes it possible to manage operations or a history of operations performed on the operation management file at a location (e.g., the PC 20) to which the operation management file is delivered from the file management server 10. Also, when the operation management file is copied or transferred, the operation management program 50 is also copied or transferred because the operation management program 50 is embedded in the operation management file itself. This in turn makes it possible to manage operations performed on (a copy of) the operation management file even when the operation management file is copied or transferred. That is, the first embodiment makes it possible to manage operations performed on the operation management file that is transferred via a network from the original destination (e.g., the PC 20) to another location or apparatus.

Also according to the file management system 1 of the first embodiment, the file management server 10 generates an operation management file whose display contents are hidden (or masked). The hidden display contents of the operation management file can be made visible (or the mask can be hidden) only when the operation management program 50 is executable and the operation management program 50 (or the PC 20) is connectable to the file management server 10.

Thus, the configuration of the first embodiment makes it possible to prevent display contents of an operation management file from being displayed (or made visible) in an environment where operations performed on the operation management file cannot be managed. This in turn makes it possible to prevent a third party from viewing the display contents of the operation management file.

<<First Variation>>

In a first variation of the first embodiment, the file management server 10 determines whether to generate an operation management file based on display contents in an original file received from the file input apparatus 30. For example, this configuration makes it possible to generate an operation management file only when display contents in an original file include confidential information, and to not generate an operation management file (or not embed the operation management program 50 in the original file) when the display contents in the original file do not include confidential information.

The system configuration of the file management system 1 and the hardware configurations of apparatuses constituting the file management system 1 of the first variation may be substantially the same as those of the first embodiment.

<Functional Configuration>

Figure 10:
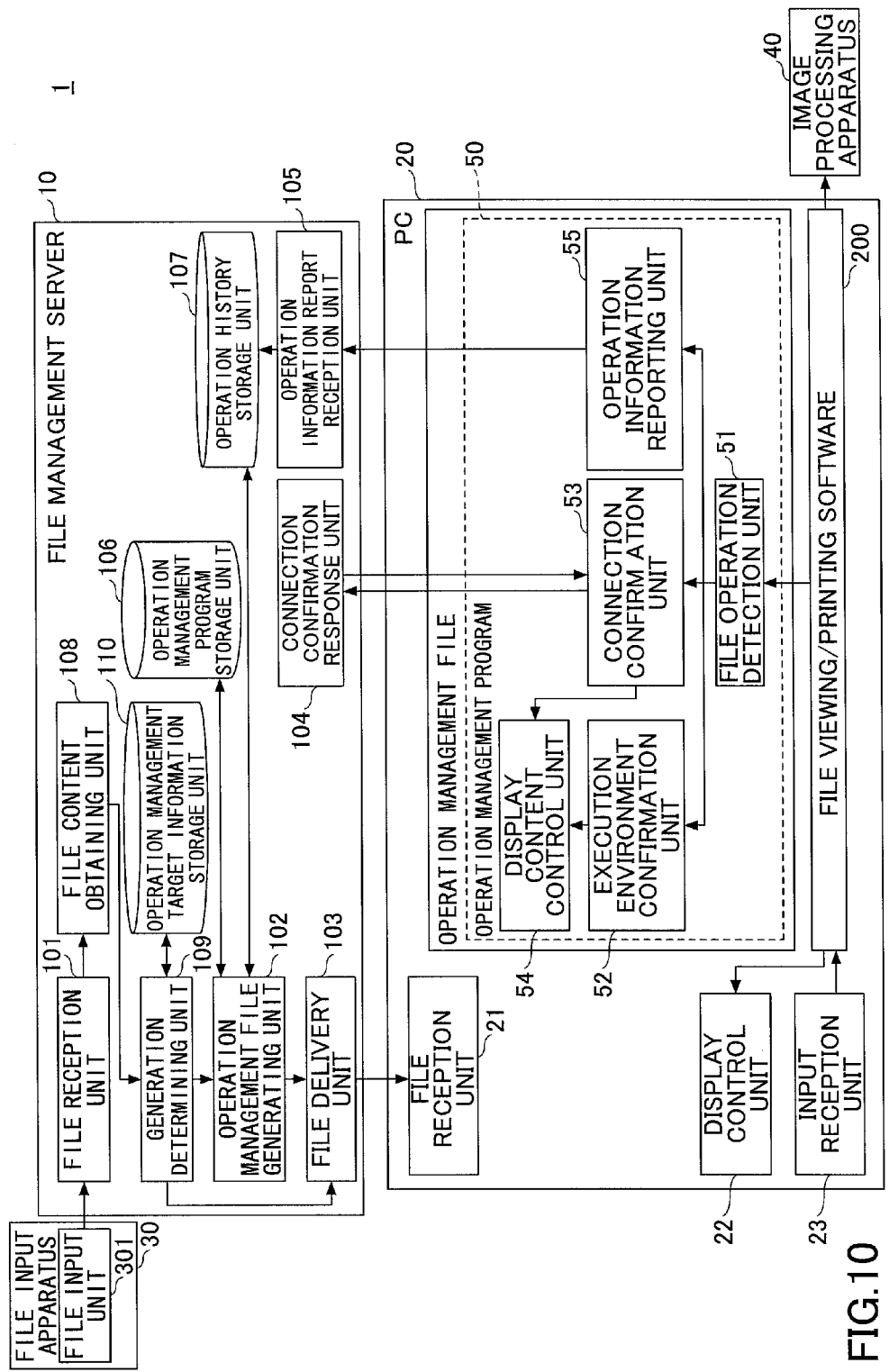
FIG. 10 is a drawing illustrating an exemplary functional configuration of a file management system according to a first variation of the first embodiment.

FIG. 10 is a drawing illustrating an exemplary functional configuration of the file management system 1 according to the first variation of the first embodiment. As illustrated by FIG. 10, the file management server 10 of the first variation includes a file content obtaining unit 108, a generation determining unit 109, and an operation management target information storage unit 110 in addition to the functional units of the file management server 10 of the first embodiment (see FIG. 5). The functional units of the file input apparatus 30 and the PC 20 of the first variation are substantially the same as those of the first embodiment.

The file content obtaining unit 108 analyzes an original file input from the file input apparatus 30, and obtains content information (e.g., text and symbols) of display contents in the original file by performing, for example, an optical character recognition (OCR) process on the original file.

The generation determining unit 109 determines whether to generate an operation management file based on the content information of the display contents obtained by the file content obtaining unit 108 and information such as keywords stored in the operation management target information storage unit 110.

The operation management target information storage unit 110 stores information used to determine whether an original file (or the display contents) is an operation management target indicating that operations performed on the original file need to be managed. FIG. 11 is a table illustrating exemplary information stored in the operation management target information storage unit 110 according to the first variation of the first embodiment. As illustrated by FIG. 11, the operation management target information storage unit 110 stores keywords in association with keyword IDs for identifying the keywords. In the example of FIG. 11, the keywords indicate confidential or classified information. When one of the keywords is included in an original file (or display contents in the original file), the original file is determined to be an operation management target (i.e., an operation management file is generated for the original file). Alternatively, the operation management target information storage unit 110 may store keywords that indicate non-confidential or non-classified information. In this case, when one of the keywords is included in an original file (or display contents in the original file), the original file (or the display contents) is determined to be not an operation management target (i.e., no operation management file is generated for the original file).

<Exemplary Process Performed by File Management Server>

Figure 13:
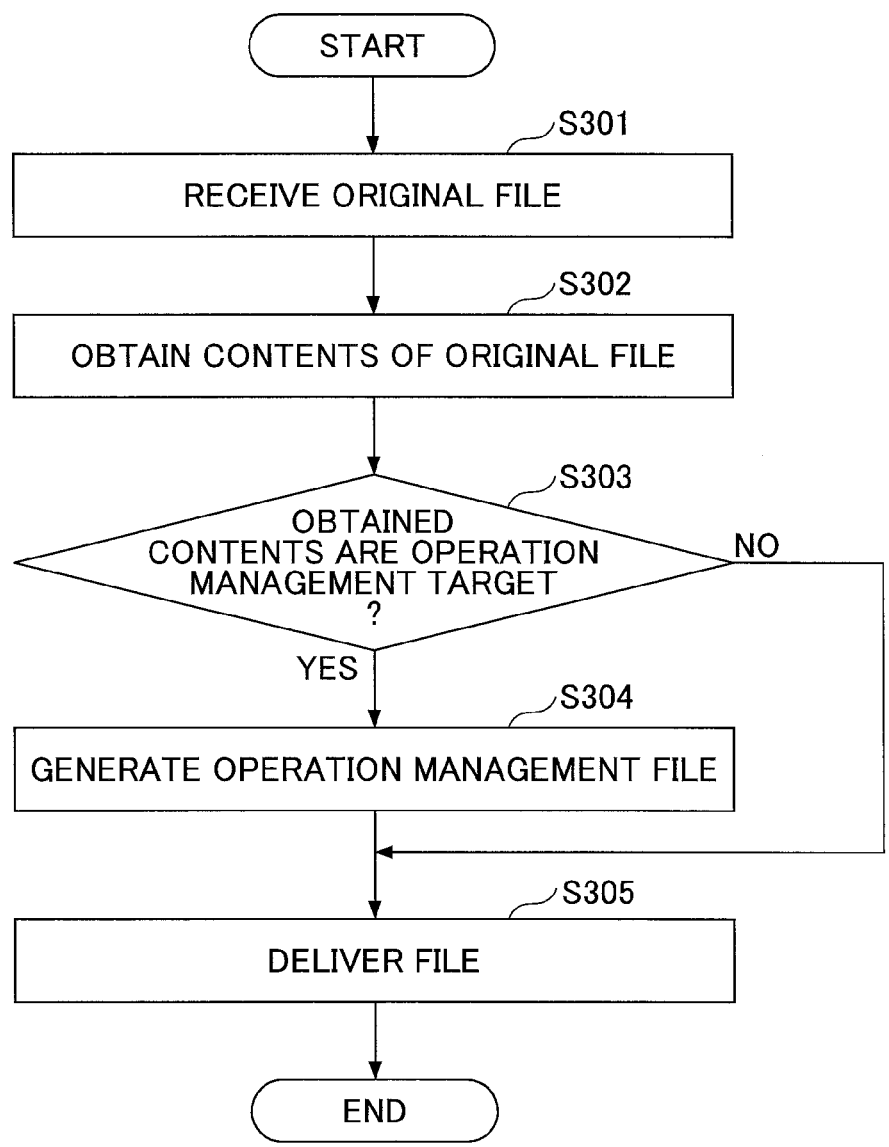
FIG. 13 is a flowchart illustrating an exemplary process performed by a file management server according to the first variation of the first embodiment.

An exemplary process of generating an operation management file by the file management server 10 of the first variation is described below. FIG. 13 is a flowchart illustrating an exemplary process performed by the file management server 10 according to the first variation of the first embodiment.

When receiving an original file, the file reception unit 101 stores the original file in a predetermined folder in the file management server 10, and reports the reception of the original file to the file content obtaining unit 108 (S301).

The file content obtaining unit 108 obtains content information (e.g., text) corresponding to display contents of the original file (S302). Then, the file content obtaining unit 108 reports to the generation determining unit 109 that the content information has been obtained.

The generation determining unit 109 determines whether the original file (or the display contents) is an operation management target based on the content information obtained from the original file and the information stored in the operation management target information storage unit 110 (S303). When the content information includes one or more of the keywords stored in the operation management target information storage unit 110, the generation determining unit 109 determines that the original file is an operation management target (YES at step S303), and the operation management file generating unit 102 generates an operation management file by embedding the operation management program 50 in the original file (S304). Then, the process proceeds to step S305.

On the other hand, when the content information includes none of the keywords stored in the operation management target information storage unit 110, the generation determining unit 109 determines that the original file is not an operation management target (NO at step S303). In this case, only the conversion of the file format of the original file is performed, and the process proceeds to step S305.

The file delivery unit 103 delivers the operation management file or the converted file (whose file format has been converted) to a specified destination (e.g., the PC 20) (S305).

As described above, according to the file management system 1 of the first variation of the first embodiment, the file management server 10 determines whether a file (original file) is an operation management target, i.e., whether to embed an operation management program in the file, based on display contents of the file.

This configuration makes it possible to treat only files including confidential information as operation management targets, and thereby makes it possible to reduce the load of generating operation management files at the file management server 10, to reduce a storage area of the file management server 10 for storing operation histories, and to reduce the load of executing the operation management program 50 at destination apparatuses (e.g., the PC 20). This in turn makes it easier for an administrator to manage the file management system 1. Also, the configuration of the first variation prevents a problem that a user of an apparatus (e.g., the PC 20) cannot view or print even a file that does not include confidential information unless the apparatus is connectable to the file management server 10.

Figure 12:
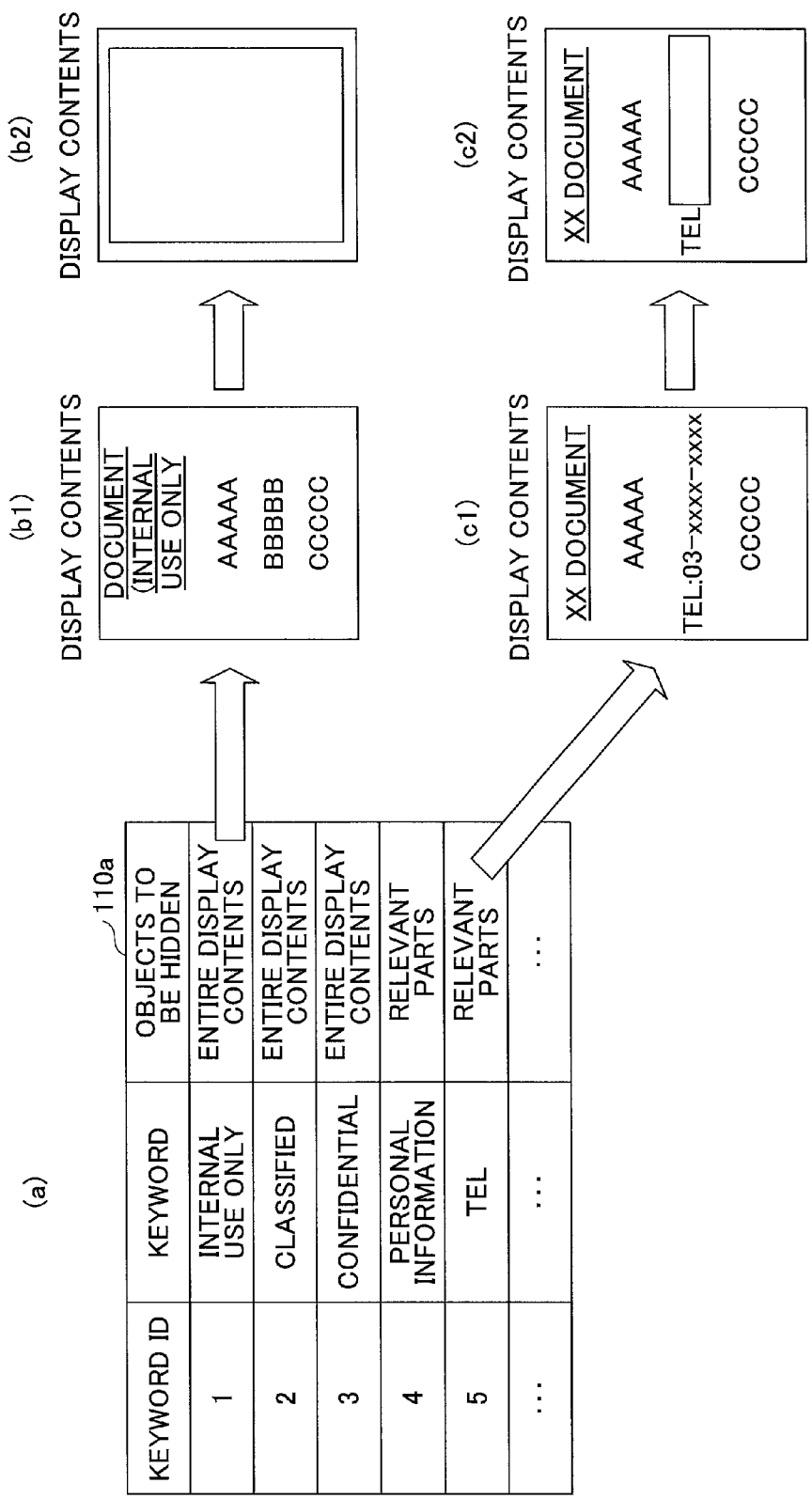
FIG. 12 is a drawing illustrating exemplary information stored in an operation management target information storage unit and exemplary display contents according to the first variation of the first embodiment.

FIG. 12 (a) illustrates an operation management target information storage unit 110a that is a variation of the operation management target information storage unit 110. The operation management target information storage unit 110a additionally stores hidden object information indicating objects to be hidden, in association with the keywords. The hidden object information may indicate, for example, that the entire file (or the entire display contents) is hidden when the corresponding keyword is included in the file, only a page of the file including the corresponding keyword is hidden, or only a value (or an area in a page) related to the corresponding keyword is hidden. For example, when a file includes a keyword "internal use only" as illustrated by FIG. 12 (b1), an operation management file is generated by embedding the operation management program 50 that is configured to hide the entire file (or the entire display contents) as illustrated by FIG. 12 (b2). As another example, when a file includes a keyword "TEL" as illustrated by FIG. 12 (c1), an operation management file is generated by embedding the operation management program 50 that is configured to hide an area where a phone number is entered as illustrated by FIG. 12 (c2). For example, an area where a series of numbers is present or an area near the keyword "TEL" (where a phone number is likely present) may be identified as the area where a phone number is entered.

<<Second Variation>>

In a second variation of the first embodiment, when a connection confirmation request is received from the PC 20 where an operation on the operation management file is to be performed, the file management server 10 determines whether to allow the operation on the operation management file (or whether to mask display contents) based on the location (address information) of the sender of the connection confirmation request. This configuration, for example, makes it possible to allow operations on the operation management file within a company where the risk of information leakage is low, and to prevent operations on the operation management file outside of the company where the risk of information leakage to a third party is relatively high.

The system configuration of the file management system 1 and the hardware configurations of apparatuses constituting the file management system 1 of the second variation may be substantially the same as those of the first embodiment.

<Functional Configuration>

Figure 14:
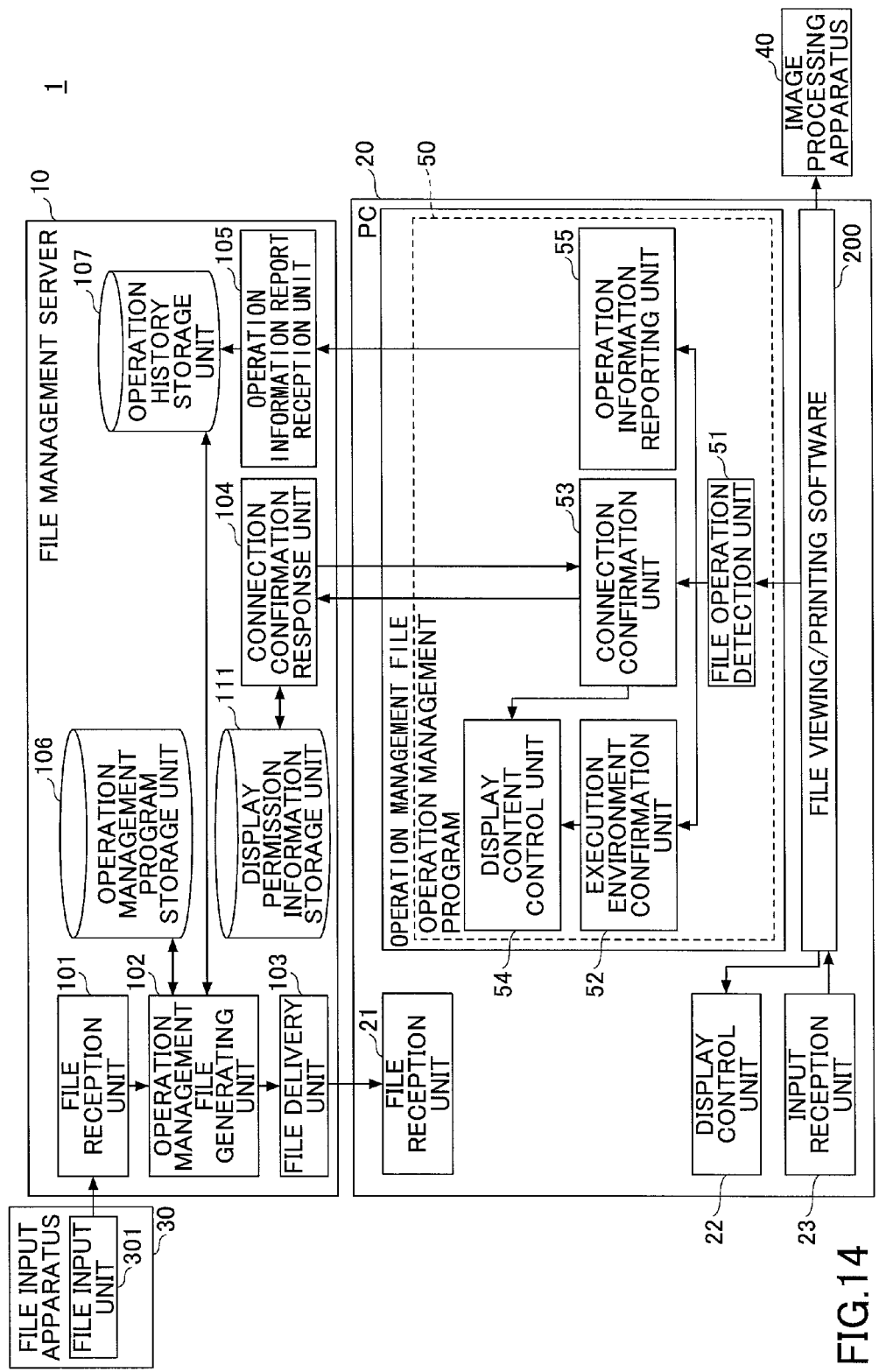
FIG. 14 is a drawing illustrating an exemplary functional configuration of a file management system according to a second variation of the first embodiment.

FIG. 14 is a drawing illustrating an exemplary functional configuration of the file management system 1 according to the second variation of the first embodiment. As illustrated by FIG. 14, the file management server 10 of the second variation includes a display permission information storage unit 111 in addition to the functional units of the file management server 10 of the first embodiment (see FIG. 5). Also in the second variation, the connection confirmation response unit 104 is configured to perform a process that is different from the first embodiment. The functional units of the file input apparatus 30 and the PC 20 of the second variation are substantially the same as those of the first embodiment.

Figure 15:
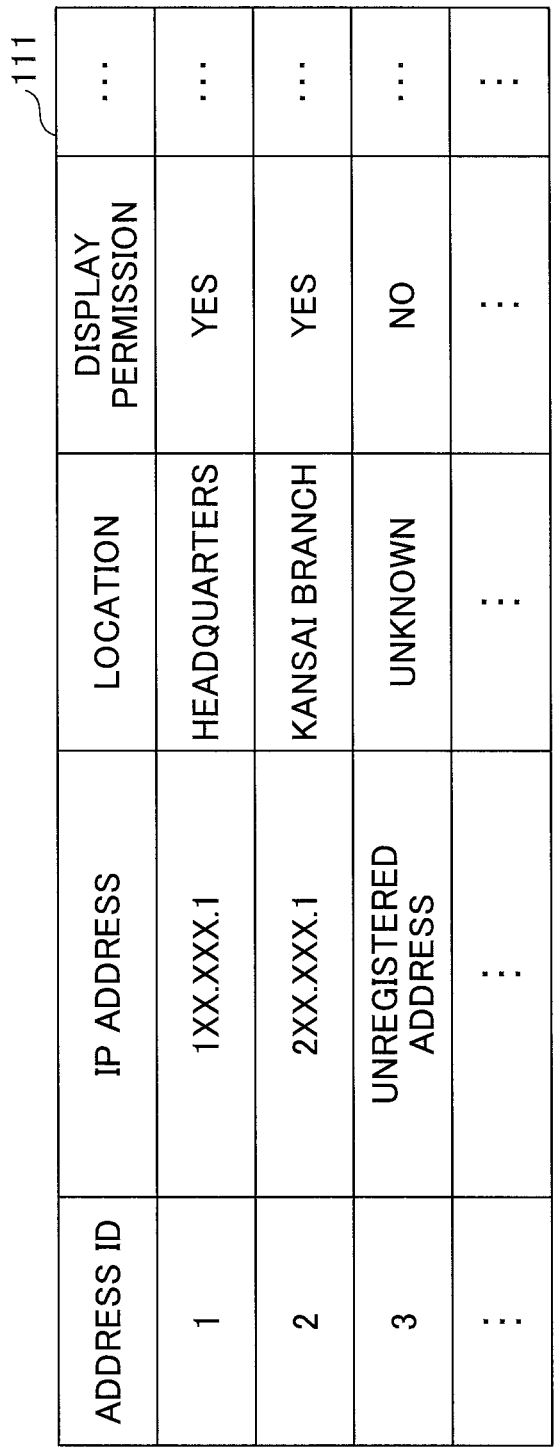
FIG. 15 is a table illustrating exemplary information stored in a display permission information storage unit according to the second variation of the first embodiment.

As illustrated by FIG. 15, the display permission information storage unit 111 stores information indicating whether to allow operations on the operation management file in association with location information (address information) of senders of connection confirmation requests. FIG. 15 is a table illustrating exemplary information stored in the display permission information storage unit 111 according to the second variation of the first embodiment. The display permission information storage unit 111 stores data items (fields) such as "address ID", "IP address", "location", and "display permission". The "address ID" field stores an address ID for uniquely identifying an IP address in the display permission information storage unit 111. The "IP address" field stores an IP address (IPv4 or IPv6). The "location" field stores a name of a location or an organization corresponding to the IP address. The "display permission" field stores display permission information indicating whether to allow displaying of the display contents of the operation management file at the location corresponding to the IP address.

When receiving a connection confirmation request from the PC 20, the connection confirmation response unit 104 of the second variation determines whether to allow the PC 20 to display the display contents of the operation management file by referring to the display permission information storage unit 111, and sends a response to the connection confirmation request including the determination result to the PC 20.

<Exemplary Process Performed by File Management Server>

Figure 16:
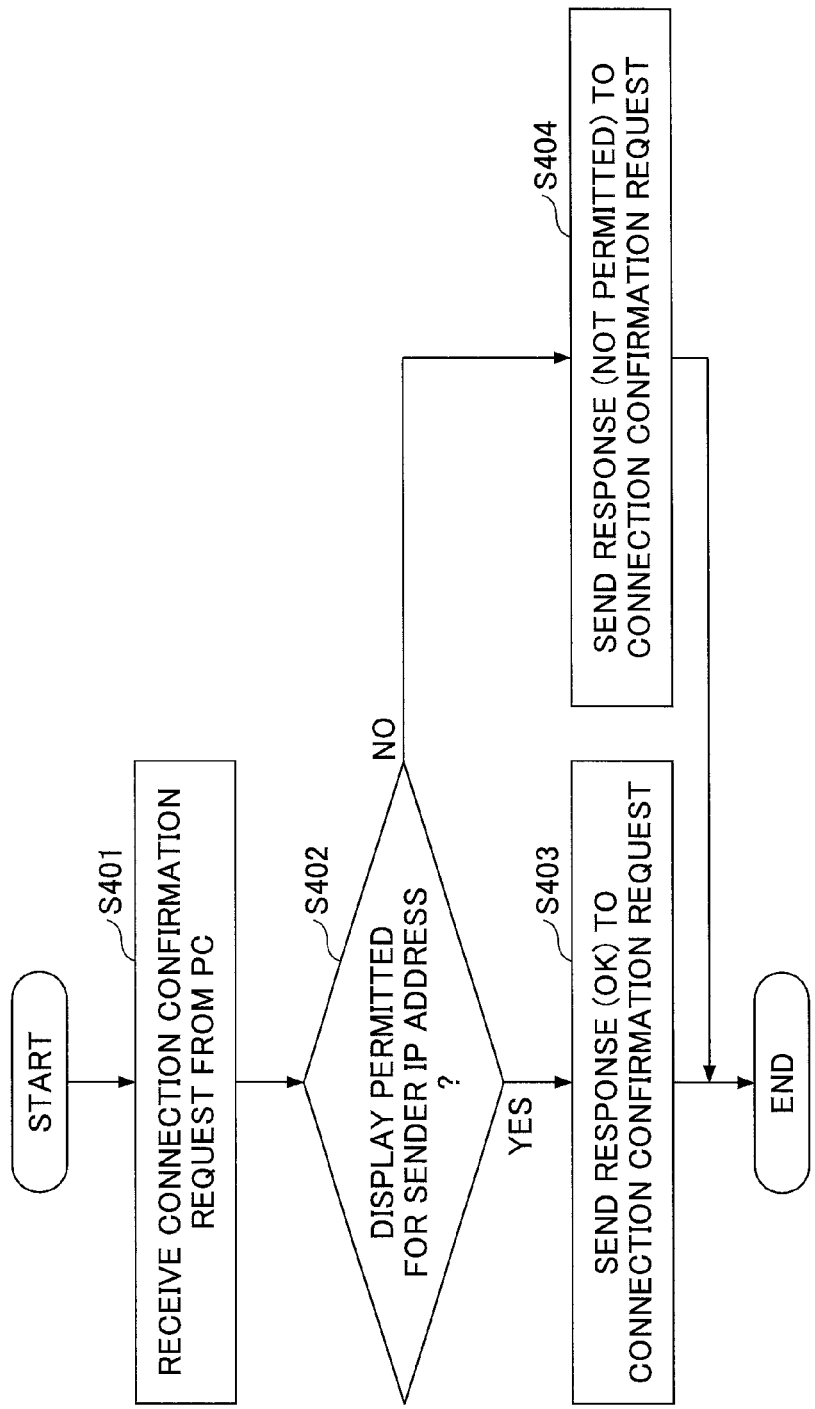
FIG. 16 is a flowchart illustrating an exemplary process performed by a file management server according to the second variation of the first embodiment.

An exemplary process performed by the file management server 10 of the second variation in response to a connection confirmation request is described below. FIG. 16 is a flowchart illustrating an exemplary process performed by the file management server 10 of the second variation of the first embodiment.

As illustrated by FIG. 16, the connection confirmation response unit 104 of the file management server 10 receives a connection confirmation request sent from the operation management program 50 in the PC 20 (S401).

The connection confirmation response unit 104 refers to the display permission information storage unit 111 based on a sender IP address in the connection confirmation request, and determines whether displaying of the display contents of the operation management file is allowed for the sender IP address (S402). More specifically, the connection confirmation response unit 104 identifies display permission information (or the "display permission" field) stored in the display permission information storage unit 111 in association with the sender IP address included in the connection confirmation request.

When displaying of the display contents of the operation management file is allowed for the sender IP address included in the connection confirmation request (YES at step S402), the connection confirmation response unit 104 sends, to the PC 20, a response including information indicating that the PC 20 is connectable to the file management server 10 (connection OK) (S403).

On the other hand, when displaying of the display contents of the operation management file is not allowed for the sender IP address included in the connection confirmation request (NO at step S402), the connection confirmation response unit 104 sends, to the PC 20, a response including information requesting to hide the display contents of the operation management file (S404). The information requesting to hide the display contents of the operation management file may be represented by information indicating that the PC 20 is not connectable to the file management server 10.

When receiving the response including information requesting to hide the display contents of the operation management file, the PC 20 (the display content control unit 54 of the operation management program 50) keeps visible the mask that hides the display contents of the operation management file.

As described above, according to the file management system 1 of the second variation of the first embodiment, the file management server 10 determines whether to allow displaying of the display contents of the operation management file based on a location (e.g., an IP address) where the operation management file is to be operated.

This configuration makes it possible to prevent the display contents of the operation management file from being displayed in a location where the risk of information leakage is high, and thereby makes is possible to reduce the risk of information leakage.

The second variation may be combined with the first variation.

Second Embodiment

System Configuration

Figure 17:
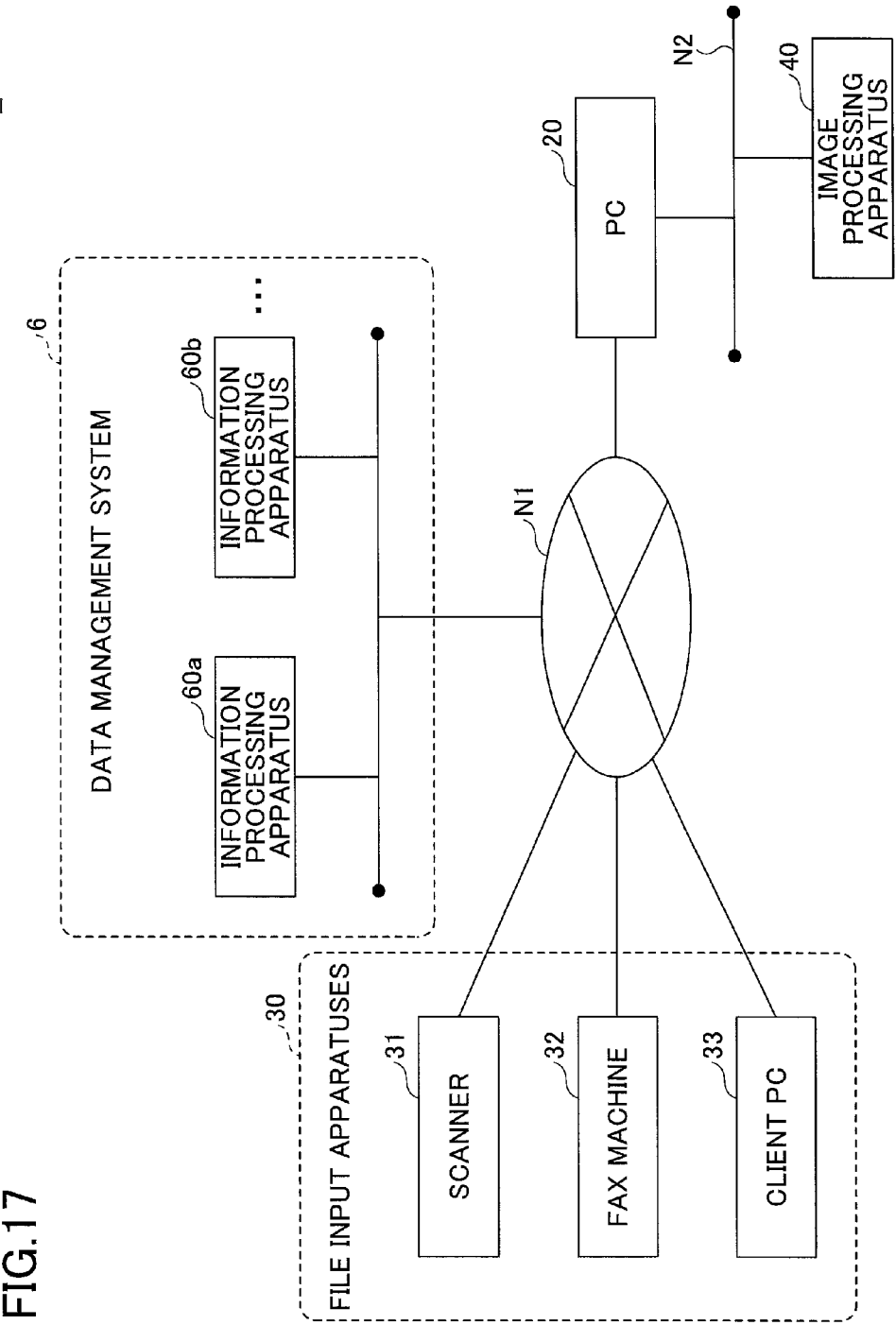
FIG. 17 is a drawing illustrating an exemplary configuration of a file management system according to a second embodiment.

FIG. 17 is a drawing illustrating an exemplary configuration of a file management system 1 according to a second embodiment. As illustrated by FIG. 17, the file management system 1 of the second embodiment includes a data management system 6 including one or more information processing apparatuses 60 (60a, 60b, . . . ) instead of the file management server 10 of the first embodiment. Each of the information processing apparatuses 60 may have a hardware configuration that is substantially the same as the hardware configuration of the file management sever 10 (FIG. 3).
<Functional Configuration>

Figure 18:
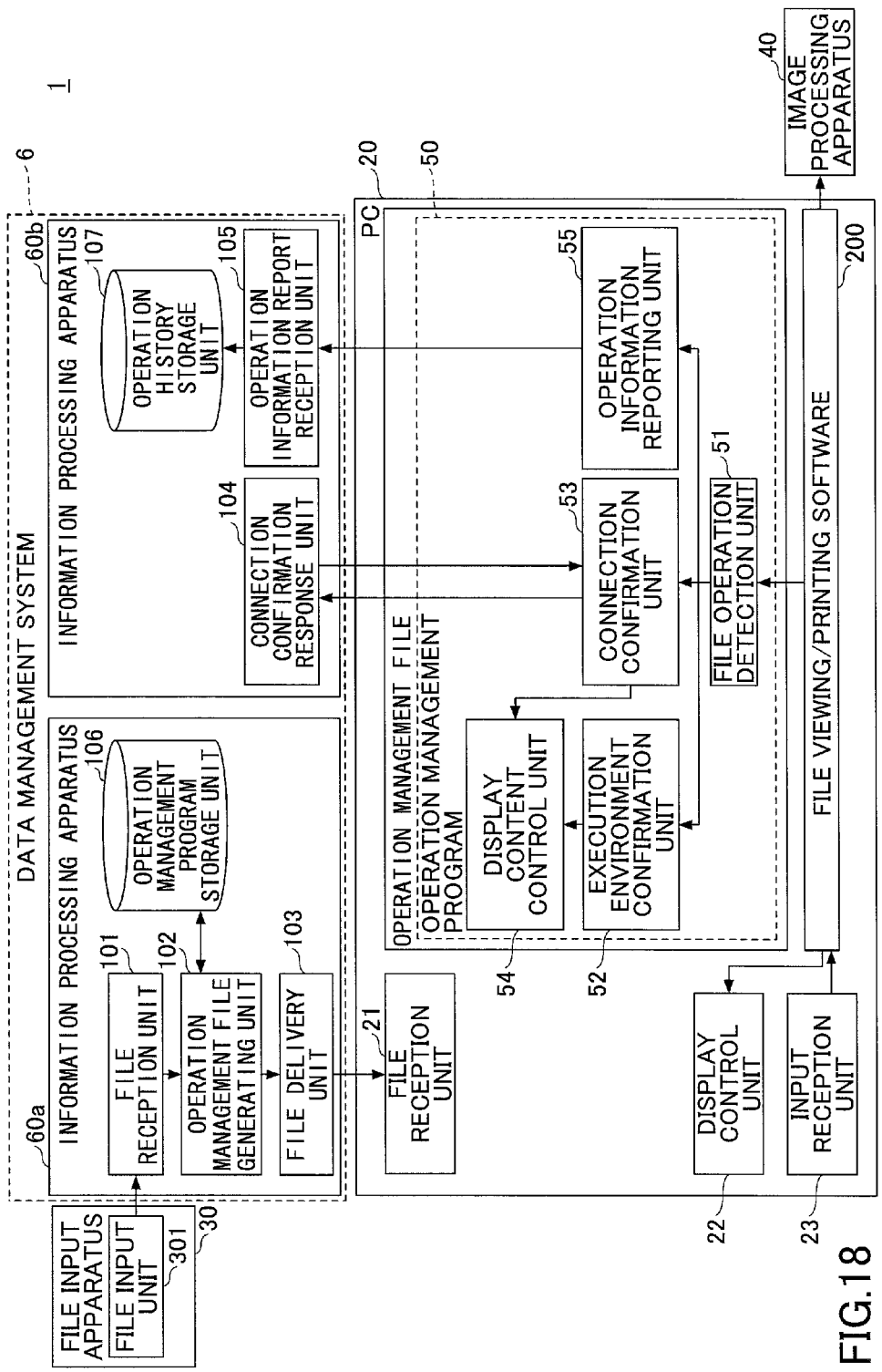
FIG. 18 is a drawing illustrating an exemplary functional configuration of a file management system according to the second embodiment.

FIG. 18 is a drawing illustrating an exemplary functional configuration of the file management system 1 according to the second embodiment. In the example of FIG. 18, functions of the file management server 10 (see FIG. 5) of the first embodiment are distributed to the information processing apparatus 60a and the information processing apparatus 60b. In FIG. 18, the same names and reference numbers as those assigned to the functional units of the file management system 1 of the first embodiment are assigned to the corresponding functional units of the file management system 1 of the second embodiment.

The information processing apparatus 60a includes a file reception unit 101, an operation management file generating unit 102, a file delivery unit 103, and an operation management program storage unit 106. The information processing apparatus 60a performs processes of generating and delivering operation management files.

On the other hand, the information processing apparatus 60b includes a connection confirmation response unit 104, an operation information report reception unit 105, and an operation history storage unit 107. The information processing apparatus 60b manages histories of operations on operation management files.

With the above functional configuration, the file management system 1 of the second embodiments can provide advantageous effects similar to those provided by the file management system 1 of the first embodiment.

Also, the second embodiment makes it possible to distribute or centralize functions of the data management system 6 depending on the locations and the number of information processing apparatuses 60. This in turn makes it possible to achieve the optimum functional layout that can reduce the equipment costs and the network load.

Also, at least one of the first variation and the second variation of the first embodiment may be applied to the file management system 1 of the second embodiment.

Third Embodiment

System Configuration

Figure 19:
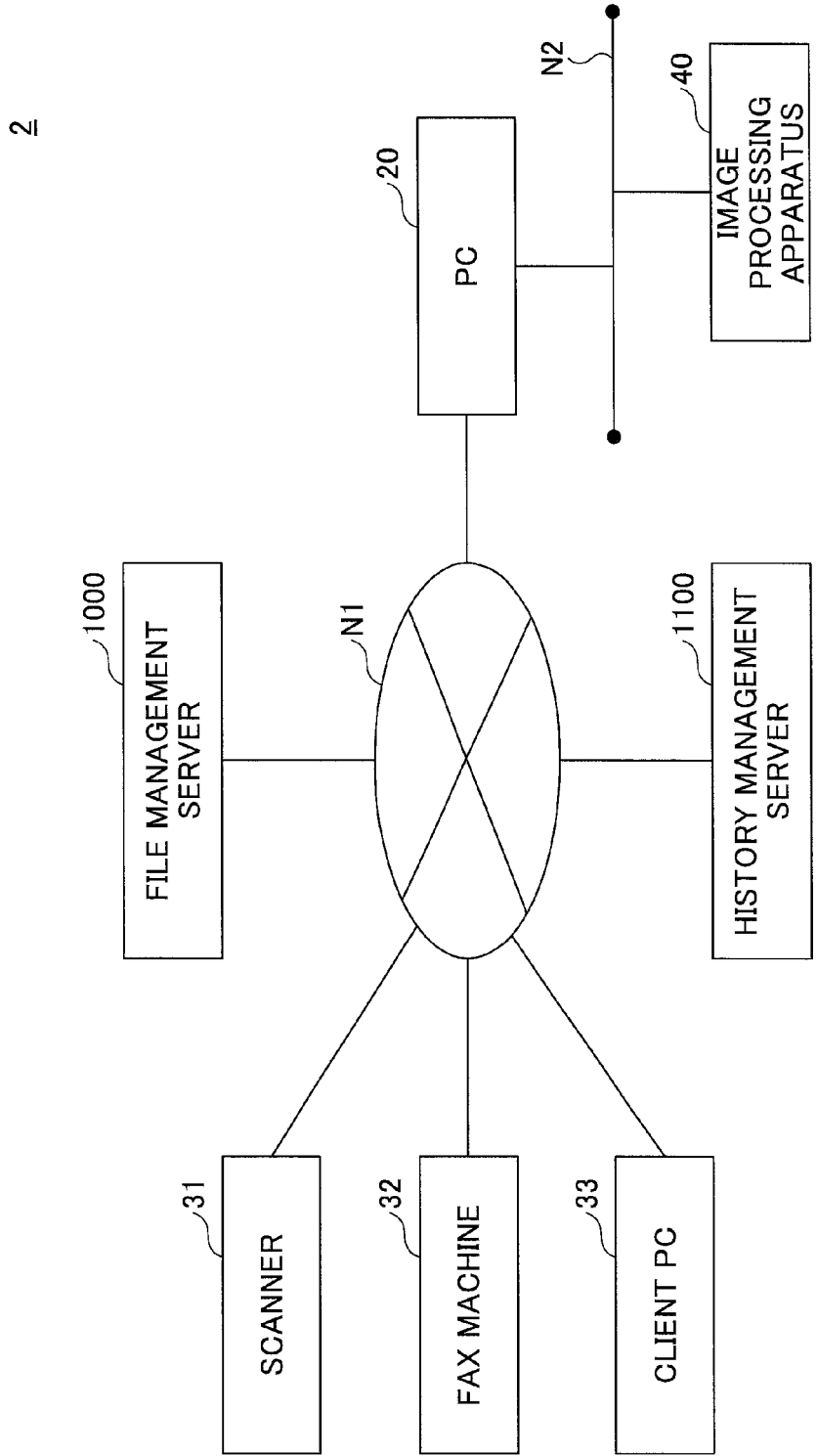
FIG. 19 is a drawing illustrating an exemplary configuration of a file management system according to a third embodiment.

FIG. 19 is a drawing illustrating an exemplary configuration of a file management system 2 according to a third embodiment. As illustrated by FIG. 19, the file management system 2 of the third embodiment includes a file management server 1000 and a history management server 1100 instead of the file management server 10 of the file management system 1 of the first embodiment.

The file management server 1000 is a computer that executes a workflow based on job information of a job entered by one of the scanner 31, the fax machine 32, and the client PC 33. A workflow indicates a process flow that is implemented by a combination of one or more process units (tasks) each of which achieves a self-contained function. In the workflow terminology, a process unit may be referred to as an "activity". A job is an execution unit of a workflow. For example, when the same workflow is executed multiple times, each execution of the workflow represents a separate job. Job information is information related to a job, and includes a flow ID of a workflow to be executed and a file such as a document file (document data) or an image file (image data) obtained by scanning a document with the scanner 31.

The history management server 1100 is a computer that manages a history of operations performed at an external apparatus (e.g., the PC 20) on a file to be processed in a workflow.

Other apparatuses in the file management system 2 are substantially the same as those in the file management system 1 of the first embodiment.
<Functional Configuration>

Figure 20:
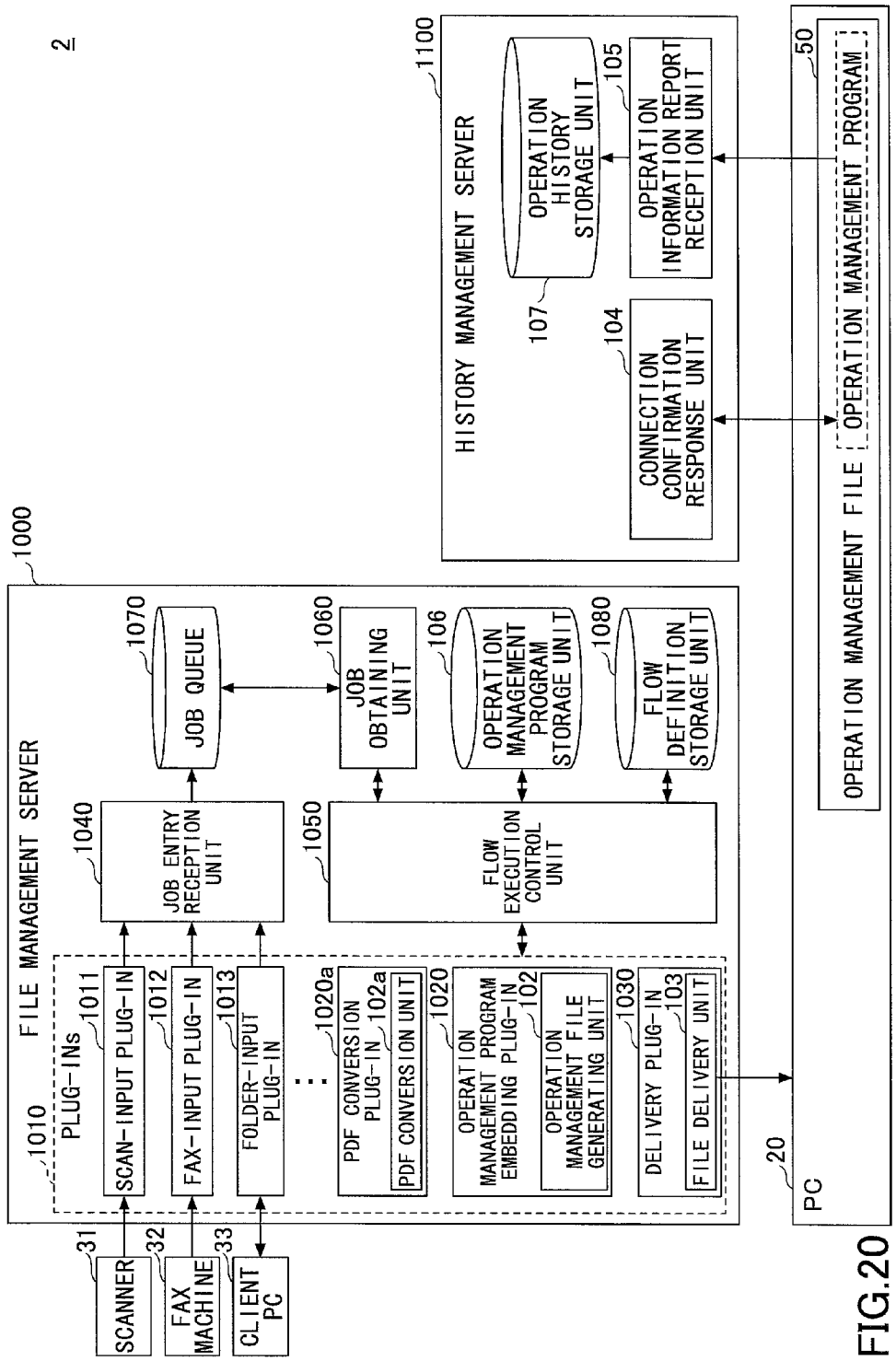
FIG. 20 is a drawing illustrating an exemplary functional configuration of a file management system according to the third embodiment.

FIG. 20 is a drawing illustrating an exemplary functional configuration of the file management system 2 according to the third embodiment. In FIG. 20, the same names and reference numbers as those assigned to the functional units of the file management system 1 of the first embodiment are assigned to the corresponding functional units of the file management system 2 of the third embodiment, and detailed descriptions of those functional units are omitted.
[File Management Server]

The file management server 1000 may include an operation management program storage unit 106, plug-ins 1010, a job entry reception unit 1040, a flow execution control unit 1050, a job obtaining unit 1060, a job queue 1070, and a flow definition storage unit 1080. The plug-ins 1010 include a scan-input plug-in 1011, a fax-input plug-in 1012, a folder-input plug-in 1013, a PDF conversion plug-in 1020a, an operation management program embedding plug-in 1020, and a delivery plug-in 1030. The PDF conversion plug-in 1020a includes a PDF conversion unit 102a, the operation management program embedding plug-in 1020 includes an operation management file generating unit 102, and the delivery plug-in 1030 includes a file delivery unit 103. The plug-ins 1010 may also include plug-ins other than those illustrated in FIG. 20.

The plug-ins 1010 include one or more plug-ins that perform processes corresponding to process units (activities) constituting a workflow. For example, one activity is implemented by one plug-in. That is, a workflow may be implemented by a series of interconnected processes performed by different plug-ins. Implementing each activity by a plug-in makes it easier to add or remove activities.

The scan-input plug-in 1011 receives a workflow execution request (job) from the scanner 31. The scan-input plug-in 1011 arranges a flow ID, a scanned image, and parameters in the workflow execution request into a format of job information supported by the flow execution control unit 1050, and stores the job information via the job entry reception unit 1040 in the job queue 1070.

The fax-input plug-in 1012 receives a workflow execution request (job) from the fax machine 32. The fax-input plug-in 1012 arranges a flow ID, image information, and parameters in the workflow execution request into a format of job information supported by the flow execution control unit 1050, and stores the job information via the job entry reception unit 1040 in the job queue 1070.

The folder-input plug-in 1013 receives a workflow execution request that is made by uploading a file containing, for example, document data in a predetermined folder of the client PC 33. The predetermined folder is not limited to a folder in the client PC 33, but may be a folder in a storage device connected via a network to the client PC 33. For example, the folder-input plug-in 1013 polls the predetermined folder, and when a file including data (e.g., document data or image data), a flow ID, and parameters is stored in the predetermined folder, the folder-input plug-in 1013 obtains the file. The folder-input plug-in 1013 arranges the information items in the obtained file into a format of job information supported by the flow execution control unit 1050, and stores the job information via the job entry reception unit 1040 in the job queue 1070.

In addition to the plug-ins 1011, 1012, and 1013, the file management server 1000 may also include an email-input plug-in that receives a workflow execution request via a file attached to an email.

The PDF conversion unit 102a of the PDF conversion plug-in 1020a converts the file format of a file included in an entered job into a PDF format.

The operation management file generating unit 102 of the operation management program embedding plug-in 1020 embeds the operation management program 50 obtained from the operation management program storage unit 106 in the file (PDF file) converted into the PDF format.

The file delivery unit 103 of the delivery plug-in 1030 delivers the file to a specified destination.

The job entry reception unit 1040 stores jobs received by the scan-input plug-in 1011, the fax-input plug-in 1012, and the folder-input plug-in 1013 in the job queue 1070.

The flow execution control unit 1050 controls execution of a workflow based on job information sent from the job obtaining unit 1060 and flow definition data stored in the flow definition storage unit 1080. The flow definition data includes definition information defining the flow of processes in a workflow. In the third embodiment, one set of flow definition data is provided for each workflow. The flow definition data includes a flow ID for identifying the workflow.

The job obtaining unit 1060 periodically accesses the job queue 1070. When one or more sets of job information are stored in the job queue 1070, the job obtaining unit 1060 sequentially retrieves the sets of job information from the job queue 1070, and sends the obtained job information to the flow execution control unit 1050.

The job queue 1070 stores job information input via the job entry reception unit 1040.

The flow definition storage unit 1080 stores flow definition data. FIG. 21 is a table illustrating exemplary information stored in the flow definition storage unit 1080 of the third embodiment. As illustrated by FIG. 21, the flow definition storage unit 1080 stores, in association with a flow ID, a workflow definition defining the order in which processes in a workflow are executed. In the example of FIG. 21, the workflow definition for a workflow with a flow ID "1" defines that the PDF conversion plug-in (1020a), the operation management program embedding plug-in (1020), and the delivery plug-in (1030) are executed in this order.

[History Management Server]

The history management server 1100 may include a connection confirmation response unit 104, an operation information report reception unit 105, and an operation history storage unit 107. The functional units of the history management server 1100 are substantially the same as the corresponding functional units of the file management server 10 of the first embodiment.

The functional units of the PC 20 and the operation management program 50 of the third embodiment are substantially the same as those of the first embodiment, and therefore their descriptions are omitted here.

<Exemplary Process Performed by File Management Server>

Figure 22:
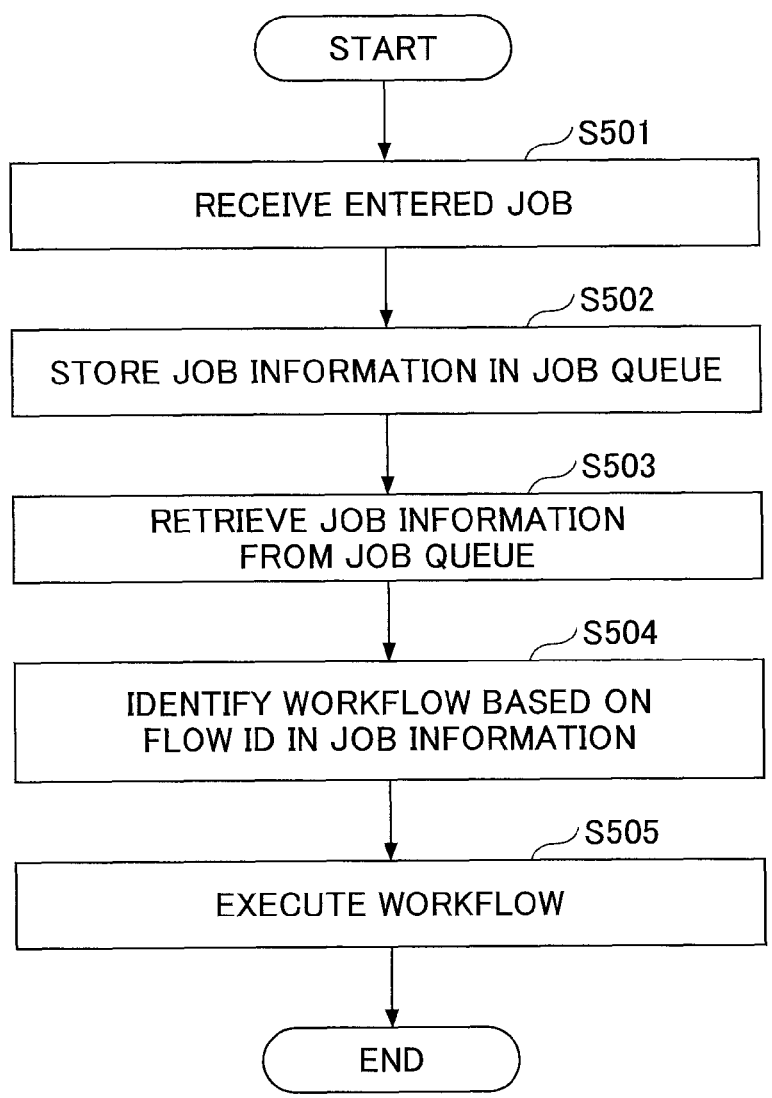
FIG. 22 is a flowchart illustrating an exemplary process performed by a file management server according to the third embodiment.

An exemplary process performed by the file management server 1000 from the entry of a job to the execution of a workflow is described below. FIG. 22 is a flowchart illustrating an exemplary process performed by the file management server 1000 of the third embodiment.

The job entry reception unit 1040 receives a job entered by the scanner 31 via the scan-input plug-in 1011 (S501), and stores job information of the received job in the job queue 1070 (S502). In this exemplary process, it is assumed that the job information includes a flow ID "1".

Step S503 is performed asynchronously with step S502. The job obtaining unit 1060, for example, periodically accesses the job queue 1070. When one or more sets of job information are stored in the job queue 1070, the job obtaining unit 1060 retrieves (a set of) job information from the job queue 1070 (S503). The job obtaining unit 1060 sends the retrieved job information to the flow execution control unit 1050. The retrieved job information is removed from the job queue 1070.

The job execution control unit 1050 refers to the flow definition storage unit 1080, and identifies a workflow corresponding to the flow ID included in the job information (S504). Assuming that the flow definition storage unit 1080 stores information as illustrated by FIG. 21 and the job information includes a flow ID "1", the job execution control unit 1050 identifies a workflow (or workflow definition) where the PDF conversion plug-in, the operation management program embedding plug-in, and the delivery plug-in are executed in this order.

The flow execution control unit 1050 executes the identified workflow using the corresponding plug-ins in the plug-ins 1010 (S505). More specifically, the flow execution control unit 1050 converts the file format of a file in the entered job into a PDF format by using the PDF conversion plug-in 1020. Next, the flow execution control unit 1050 generates an operation management file by embedding the operation management program 50 obtained from the operation management program storage unit 106 in the file (PDF file) converted into the PDF format by using the operation management program embedding plug-in 1020. Then, the flow execution control unit 1050 delivers the generated operation management file to a destination included in the entered job by using the delivery plug-in 1030.

The process performed by the operation management program 50 of the third embodiment is substantially the same as the process (see FIG. 9) performed by the operation management program 50 of the first embodiment. In the third embodiment, different from the first embodiment, an operation information report indicating an operation performed on the operation management file is sent from the operation management program 50 (or the PC 20) to the history management server 1100 instead of the file management server 10. However, processes performed by the operation management program 50 and the history management server 1100 of the third embodiment are substantially the same as those performed by the operation management program 50 and the file management server 10 of the first embodiment.

As described above, according to the file management system 2 of the third embodiment, processes constituting a workflow are implemented by plug-ins, and operations performed on a file are managed according to a defined workflow (a combination of plug-ins). Also according to the file management system 2 of the third embodiment, histories of operations performed on files are managed by the history management server 1100.

With the above described configuration, the file management system 2 of the third embodiment can provide advantageous effects similar to those provided by the file management system 1 of the first embodiment. The third embodiment also makes it possible to easily add functions for managing operations on files to the file management server 1000 for managing workflows. According to the third embodiment, the file management server 1000 generates an operation management file, and the history management server 1100 manages operation histories. This configuration makes it possible to flexibly determine functions provided by apparatuses, and flexibly determine the layout of apparatuses on a network.

The functions of the file management server 1000 and the history management server 1100 may be implemented by one apparatus.

Also, at least one of the first variation and the second variation of the first embodiment may be applied to the file management system 2 of the third embodiment.

A file in the above embodiments is an example of electronic data. The file management server 10/1000 is an example of a data management apparatus (or information processing apparatus) for managing electronic data. The file input apparatus 30 is an example of a data input apparatus for inputting electronic data. That is, data in which the operation management program 50 is embedded is not limited to a file. The operation management program 50 may be embedded in any type of electronic data that is input from a data input apparatus and received directly or indirectly by a data management apparatus. Here, indirectly receiving electric data indicates a case where electronic data sent from a data input apparatus is stored in a predetermined storage area, and a data management apparatus obtains the electric data from the predetermined storage area An aspect of this disclosure provides a data management system, a data management method, and a data management apparatus that make it possible to easily manage operations performed on electronic data that is delivered or moved to an apparatus.

A data management system, a data management method, and a data management apparatus according to embodiments of the present invention are described above. However, the present invention is not limited to the specifically disclosed embodiments, and variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD-ROM, magnetic tape device or solid state memory device.

What is claimed is:

1. A data management system implemented by one or more information processing apparatuses, the data management system comprising:

a program storage unit that stores an operation management program for controlling whether to hide or make visible display contents of data;

a generating unit that embeds the operation management program in first data and thereby generates second data including the first data and the operation management program embedded therein, display contents of the first data in the generated second data being hidden by the operation management program, wherein when an operation is performed on the second data at an external apparatus, the operation management program sends operation information indicating the operation from the external apparatus to the data management system.

2. The data management system as claimed in claim 1, further comprising:

a reception unit that receives the operation information from the external apparatus; and a history storage unit that stores the operation information received by the reception unit.

3. The data management system as claimed in claim 1, further comprising:

a response unit that sends a response to a connection confirmation request sent from the external apparatus where the second data is stored, wherein when a connection between the external apparatus and the data management system is confirmed based on the response sent from the response unit, the operation management program makes the hidden display contents of the first data visible.

4. The data management system as claimed in claim 3, further comprising:

a display permission information storage unit that stores, in association with address information, permission information indicating whether to allow the external apparatus corresponding to the address information to display the display contents of the first data, wherein the response unit refers to the display permission information storage unit based on sender address information of the confirmation request to determine whether the external apparatus is allowed to display the display contents of the first data; and when the external apparatus is not allowed to display the display contents of the first data, the response unit sends the response that requests the operation management program to not make the display contents of the first data visible.

5. The data management system as claimed in claim 3, wherein the operation management program hides the display contents of the first data by masking the display contents of the first data, and makes the display contents of the first data visible by unmasking the display contents of the first data.

6. The data management system as claimed in claim 1, further comprising:
   an obtaining unit that analyzes the first data to obtain the display contents of the first data; and
   a management target information storage unit that stores information indicating whether the display contents of the first data are an operation management target,
   wherein when the display contents of the first data are determined to be the operation management target based on the information stored in the management target information storage unit, the generating unit generates the second data.

7. A method performed by a data management system implemented by one or more information processing apparatuses, the method comprising:
   obtaining, by the data management system, an operation management program from a program storage unit, the operation management program being for controlling whether to hide or make visible display contents of data;
   embedding, by the data management system, the operation management program in first data to generate second data including the first data and the operation management program embedded therein, display contents of the first data in the generated second data being hidden by the operation management program,
   wherein when an operation is performed on the second data at an external apparatus, the operation management program sends operation information indicating the operation from the external apparatus to the data management system.

8. The method as claimed in claim 7, further comprising:
   receiving, by the data management system, the operation information sent from the external apparatus; and
   storing, by the data management system, the received operation information in a history storage unit.

9. The method as claimed in claim 7, further comprising:
   sending, by the data management system, a response to a connection confirmation request sent from the external apparatus where the second data is stored,
   wherein when a connection between the external apparatus and the data management system is confirmed based on the response, the operation management program makes the hidden display contents of the first data visible.

10. The method as claimed in claim 9, further comprising:
    determining, by the data management system, whether the external apparatus is allowed to display the display contents of the first data by referring to a display permission information storage unit based on sender address information of the confirmation request, the display permission information storage unit storing, in association with address information, permission information indicating whether to allow the external apparatus corresponding to the address information to display the display contents of the second first data,
    wherein when the external apparatus is not allowed to display the display contents of the first data, the data management system sends the response that requests the operation management program to not make the display contents of the first data visible.

11. The method as claimed in claim 9, wherein the operation management program hides the display contents of the first data by masking the display contents of the first data, and makes the display contents of the first data visible by unmasking the display contents of the first data.

12. The method as claimed in claim 7, further comprising:
    analyzing, by the data management system, the first data to obtain the display contents of the first data; and
    determining, by the data management system, whether the obtained display contents of the first data are an operation management target by referring to a management target information storage unit that stores information indicating whether the display contents of the first data are the operation management target,
    wherein the second data is generated when the obtained display contents of the first data are determined to be the operation management target.

13. A data management apparatus, comprising:
    a program storage unit that stores an operation management program for controlling whether to hide or make visible display contents of data;
    a generating unit that embeds the operation management program in first data and thereby generates second data including the first data and the operation management program embedded therein, display contents of the first data in the generated second data being hidden by the operation management program,
    wherein when an operation is performed on the second data at an external apparatus, the operation management program sends operation information indicating the operation from the external apparatus to the data management apparatus.

14. The data management apparatus as claimed in claim 13, further comprising:
    a reception unit that receives the operation information from the external apparatus; and
    a history storage unit that stores the operation information received by the reception unit.

15. The data management apparatus as claimed in claim 13, further comprising:
    a response unit that sends a response to a connection confirmation request sent from the external apparatus where the second data is stored,
    wherein when a connection between the external apparatus and the data management apparatus is confirmed based on the response sent from the response unit, the operation management program makes the hidden display contents of the first data visible.

16. The data management apparatus as claimed in claim 15, further comprising:
    a display permission information storage unit that stores, in association with address information, permission information indicating whether to allow the external apparatus corresponding to the address information to display the display contents of the first data, wherein
    the response unit refers to the display permission information storage unit based on sender address information of the confirmation request to determine whether the external apparatus is allowed to display the display contents of the first data; and
    when the external apparatus is not allowed to display the display contents of the first data, the response unit sends the response that requests the operation management program to not make the display contents of the first data visible.

17. The data management apparatus as claimed in claim 15, wherein the operation management program hides the display contents of the first data by masking the display contents of the first data, and makes the display contents of the first data visible by unmasking the display contents of the first data.

18. The data management apparatus as claimed in claim 13, further comprising:
- an obtaining unit that analyzes the first data to obtain the display contents of the first data; and
- a management target information storage unit that stores information indicating whether the display contents of the first data are an operation management target,
- wherein when the display contents of the first data are determined to be the operation management target based on the information stored in the management target information storage unit, the generating unit generates the second data.

\* \* \* \* \*